(12) United States Patent
Kajimura

(10) Patent No.: US 10,219,138 B2
(45) Date of Patent: Feb. 26, 2019

(54) DEVICE AND NOTIFICATION METHOD

(71) Applicant: NEC Corporation, Minato-ku, Tokyo (JP)

(72) Inventor: Yukie Kajimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/747,474

(22) PCT Filed: Aug. 17, 2016

(86) PCT No.: PCT/JP2016/003751
§ 371 (c)(1),
(2) Date: Jan. 25, 2018

(87) PCT Pub. No.: WO2017/029810
PCT Pub. Date: Feb. 23, 2017

(65) Prior Publication Data
US 2018/0220287 A1    Aug. 2, 2018

(30) Foreign Application Priority Data
Aug. 19, 2015   (JP) .................................. 2015-161713

(51) Int. Cl.
*H04W 4/02* (2018.01)
*H04W 4/90* (2018.01)
(Continued)

(52) U.S. Cl.
CPC .............. *H04W 4/90* (2018.02); *G08B 21/02* (2013.01); *G08B 25/04* (2013.01); *G08B 27/00* (2013.01);
(Continued)

(58) Field of Classification Search
CPC ......... H04W 4/22; H04W 4/06; H04W 48/12; H04W 68/005; H04W 76/007;
(Continued)

(56) References Cited

U.S. PATENT DOCUMENTS

| | | | |
|---|---|---|---|
| 6,169,476 B1 * | 1/2001 | Flanagan ............... | G08B 21/10 340/286.02 |
| 2005/0233726 A1 * | 10/2005 | Katsube .................. | H04W 4/90 455/404.1 |

(Continued)

FOREIGN PATENT DOCUMENTS

| | | |
|---|---|---|
| JP | 2003-186980 A | 7/2003 |
| JP | 2013-187580 A | 9/2013 |
| JP | 2015-084167 A | 4/2015 |
| WO | 2005/004076 A1 | 1/2005 |

OTHER PUBLICATIONS

International Search Report for PCT Application No. PCT/JP2016/003751, dated Nov. 1, 2016.
(Continued)

*Primary Examiner* — Nimesh Patel

(57) ABSTRACT

In order to solve a problem that a service relating to the safety of a user of a terminal cannot be provided with high reliability, this device is provided with: a transmission means that takes a predetermined opportunity related to the occurrence of a disaster to transmit a signal urging a reply by a spontaneous operation to a connected first terminal; a determination means that determines whether or not the information transmitted from the first terminal in response to the transmission is spontaneous information transmitted by the spontaneous operation of a user of the first terminal; and a processing means that, when the determination means determines that the information is the spontaneous information, performs predetermined processing related to the safety of the user of the first terminal. The predetermined processing may be processing for transmitting safety information indicating that the user of the first terminal is safe to a second terminal possessed by a family.

16 Claims, 19 Drawing Sheets

FLOWCHART FOR EXPLAINING OPERATION (PRE-REGISTRATION CONFIRMATION OPERATION) IN SYSTEM ACCORDING TO FIRST EXAMPLE EMBODIMENT

(51) Int. Cl.
*G08B 21/02* (2006.01)
*G08B 25/04* (2006.01)
*G08B 27/00* (2006.01)
*H04M 1/00* (2006.01)
*H04M 11/04* (2006.01)
*H04W 4/024* (2018.01)
*H04W 8/00* (2009.01)
*H04W 88/14* (2009.01)

(52) U.S. Cl.
CPC ............. *H04M 1/00* (2013.01); *H04M 11/04* (2013.01); *H04W 4/024* (2018.02); *H04W 8/005* (2013.01); *H04W 88/14* (2013.01)

(58) Field of Classification Search
CPC ... H04W 48/08; H04W 72/1289; H04W 4/00; H04W 68/00; H04W 4/90; H04W 76/50; H04W 72/005; H04W 4/02; H04W 4/021; H04W 4/029; H04W 4/046; H04H 20/59; H04H 20/72; H04H 20/71; H04H 20/16; H04L 5/0007; H04L 5/0053; H04L 12/189; H04L 12/18; H04L 65/4076; H04L 41/0853; H04L 41/12; H04L 41/145; H04L 41/147; H04L 41/5009; H04L 47/24; G08B 27/008; G08B 21/10; H04B 1/123; G11B 2020/1238; G11B 2020/1277; G11B 20/1258; G11B 5/581; G06F 9/542; H04M 11/04; H04M 11/00; G08G 1/0965; G08G 1/005; G08G 1/087; G08G 1/096791; G08G 1/164; G08G 1/096716; G08G 1/205
See application file for complete search history.

(56) References Cited

U.S. PATENT DOCUMENTS

| | | | |
|---|---|---|---|
| 2006/0079200 A1* | 4/2006 | Hirouchi | H04L 12/1895 455/404.1 |
| 2007/0241932 A1* | 10/2007 | Otero | G08G 1/096716 340/901 |
| 2007/0296575 A1* | 12/2007 | Eisold | G08B 27/006 340/539.16 |
| 2009/0233634 A1* | 9/2009 | Aghili | H04W 4/90 455/466 |
| 2010/0026472 A1* | 2/2010 | Kitazoe | G08B 27/006 340/311.2 |
| 2010/0159870 A1* | 6/2010 | Jokinen | H04W 4/90 455/404.1 |
| 2011/0059748 A1* | 3/2011 | Taylor | H04W 4/02 455/456.1 |
| 2011/0151828 A1* | 6/2011 | Gou | H04M 3/5116 455/404.1 |
| 2013/0036175 A1* | 2/2013 | Lau | G08B 27/001 709/206 |
| 2014/0045481 A1* | 2/2014 | Fraley | H04W 52/0258 455/418 |
| 2014/0051379 A1* | 2/2014 | Ganesh | H04M 1/72538 455/404.1 |
| 2015/0237657 A1* | 8/2015 | Igarashi | H04W 76/007 455/404.2 |

OTHER PUBLICATIONS

English translation of Written opinion for PCT Application No. PCT/JP2016/003751.
Japanese Office Action for JP Application No. 2017-535240 dated Oct. 16, 2018 with English Translation.

* cited by examiner

Fig.2

| PHONE NUMBER | NAME | NOTIFICATION DESTINATION PHONE NUMBER |
|---|---|---|
| 090-xxxx-xxxx (PHONE NUMBER OF TERMINAL 1) | XXTARO | 080-yyyy-yyyy (PHONE NUMBER OF TERMINAL 2) |
| 090-zzzz-zzzz | △△HANAKO | 090-wwww-wwww |
| 090-pppp-pppp | ○○JIRO | 03-nnnn-nnnn |
| ... | ... | ... |

ONE EXAMPLE OF REGISTRATION TABLE INCLUDED IN SYSTEM ACCORDING TO FIRST EXAMPLE EMBODIMENT

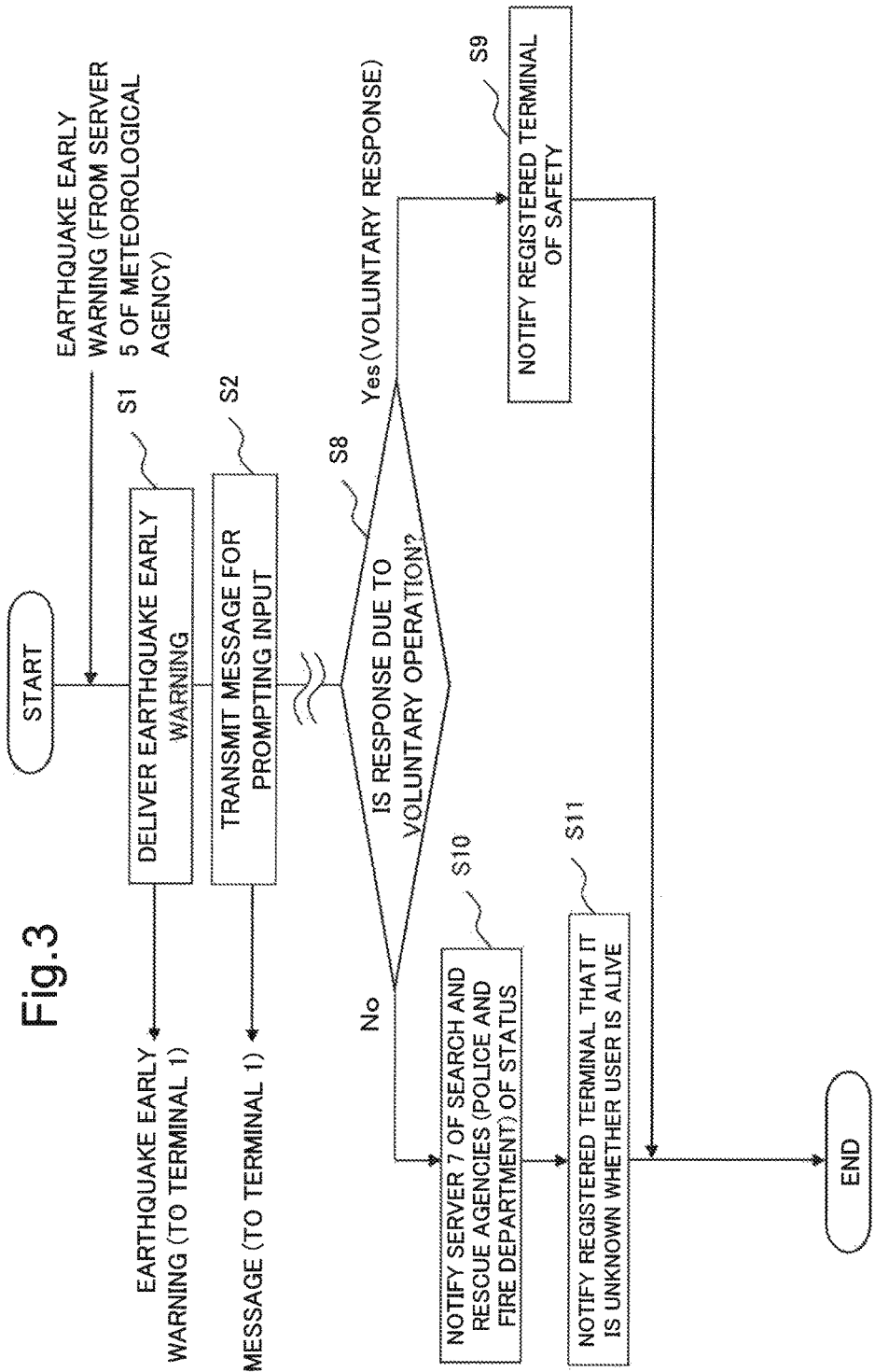

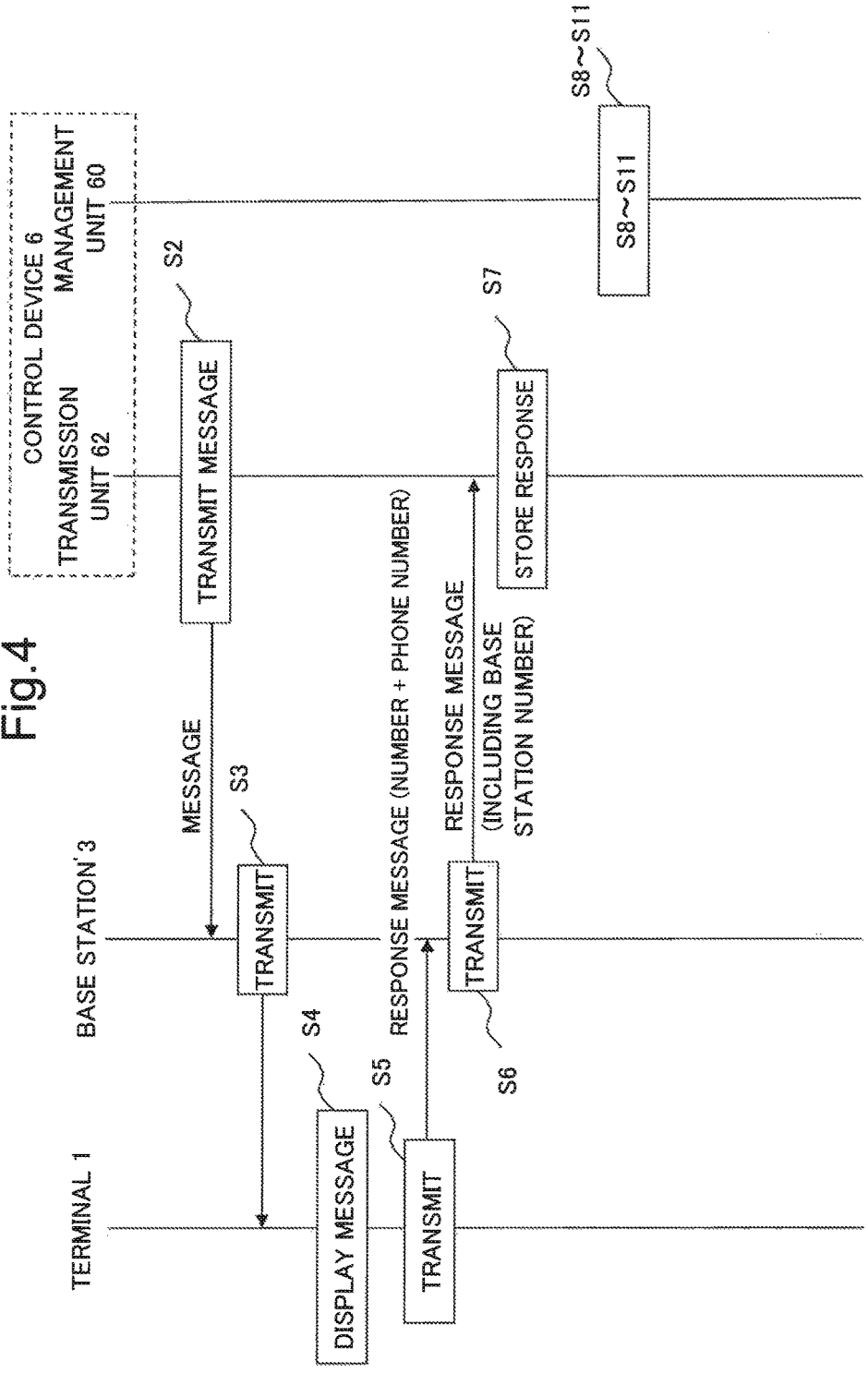

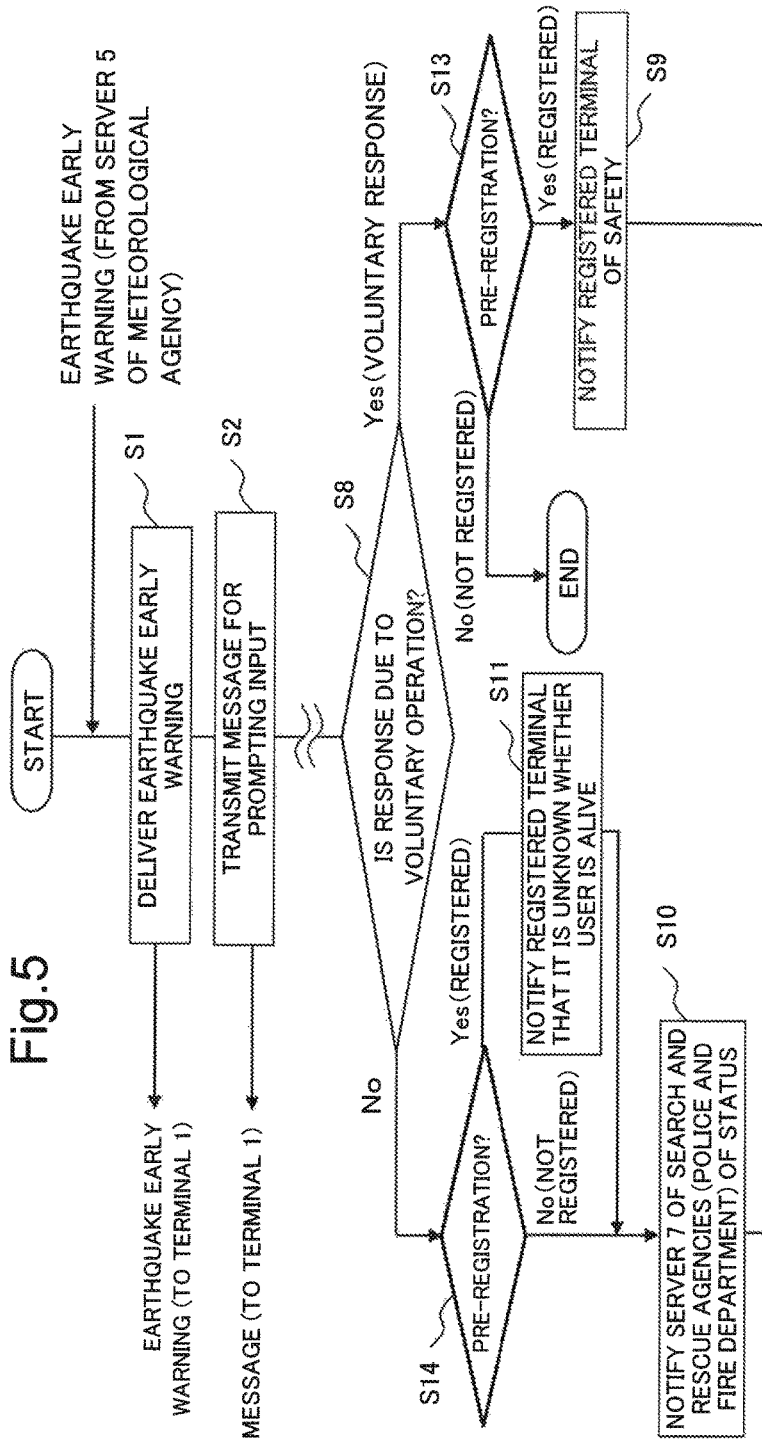

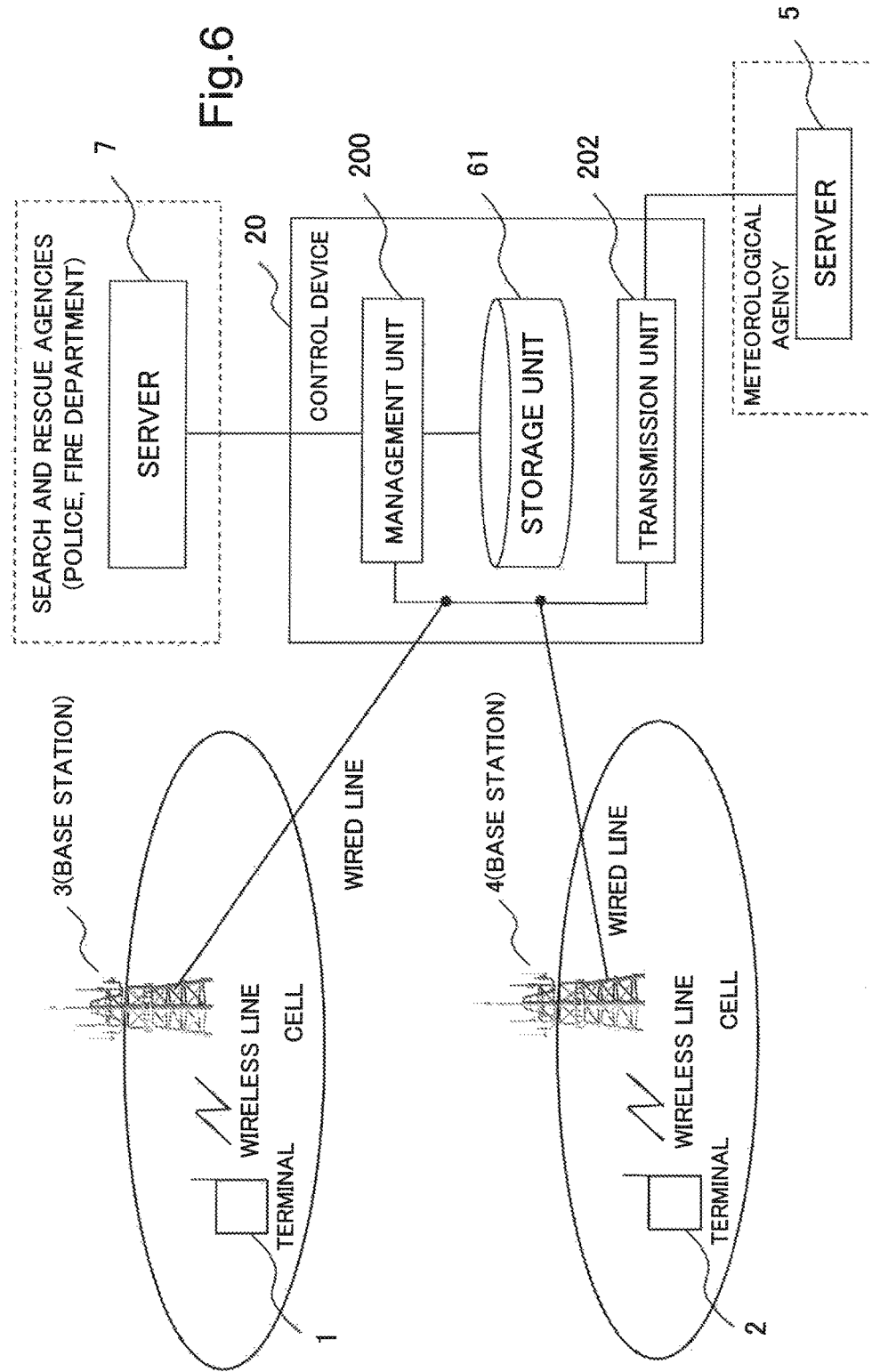

Fig.7

| BASE STATION NUMBER | EVACUATION RELATED INFORMATION ||
| --- | --- | --- |
| | EVACUATION LOCATION | ROUTE (WAY) TO EVACUATION LOCATION |
| BASE STATION 3 | ○○ELEMENTARY SCHOOL | ADVANCE TOWARD CITY CENTER ALONG △△ STREET AND TURN RIGHT AT ×× |
| BASE STATION 4 | □□CIVIC CENTER | GO STRAIGHT ALONG ROAD IN FRONT OF ◇◇ STATION |
| ⋮ | ⋮ | ⋮ |

ONE EXAMPLE OF EVACUATION RELATED INFORMATION TABLE INCLUDED IN SYSTEM ACCORDING TO SECOND EXAMPLE EMBODIMENT

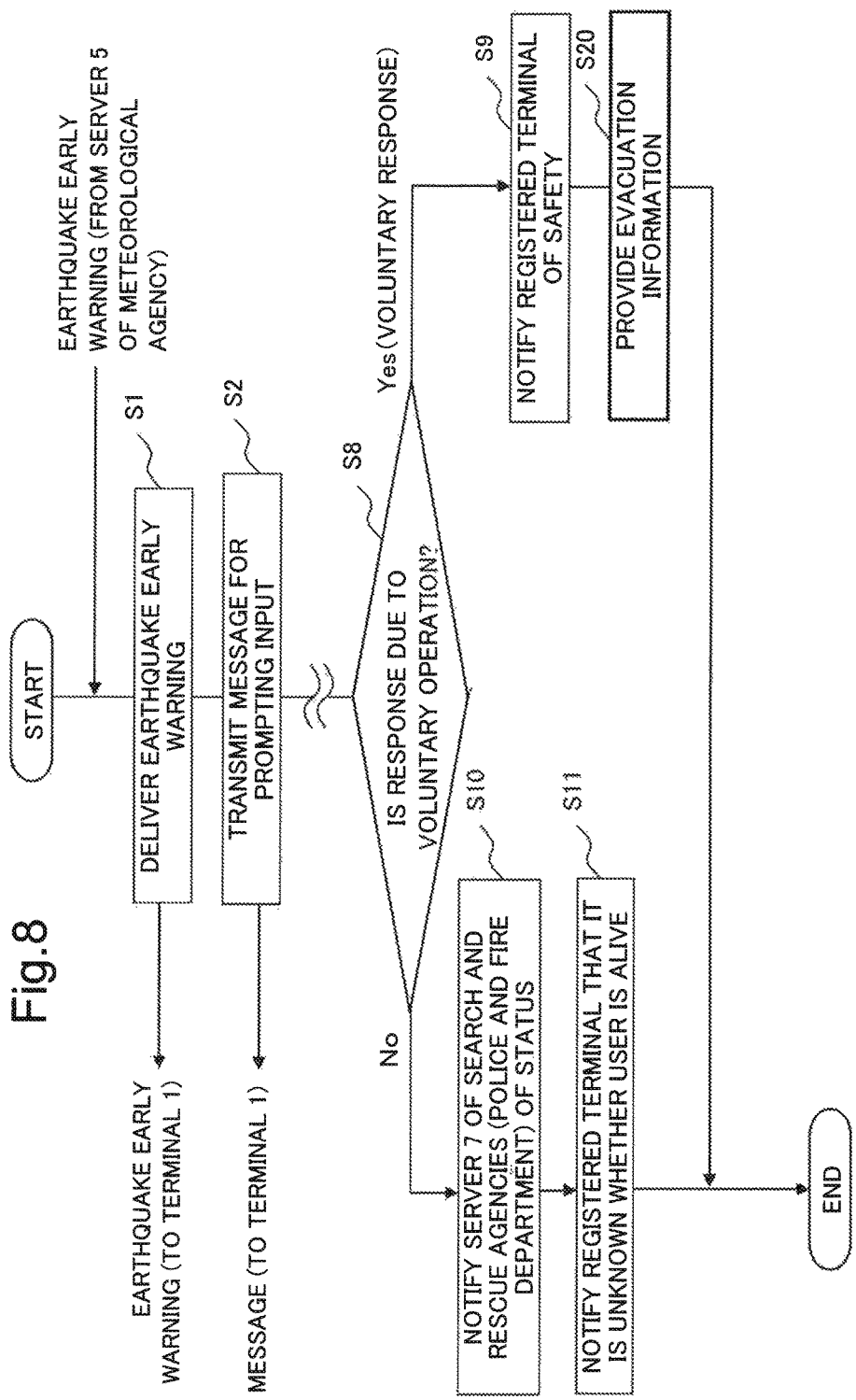

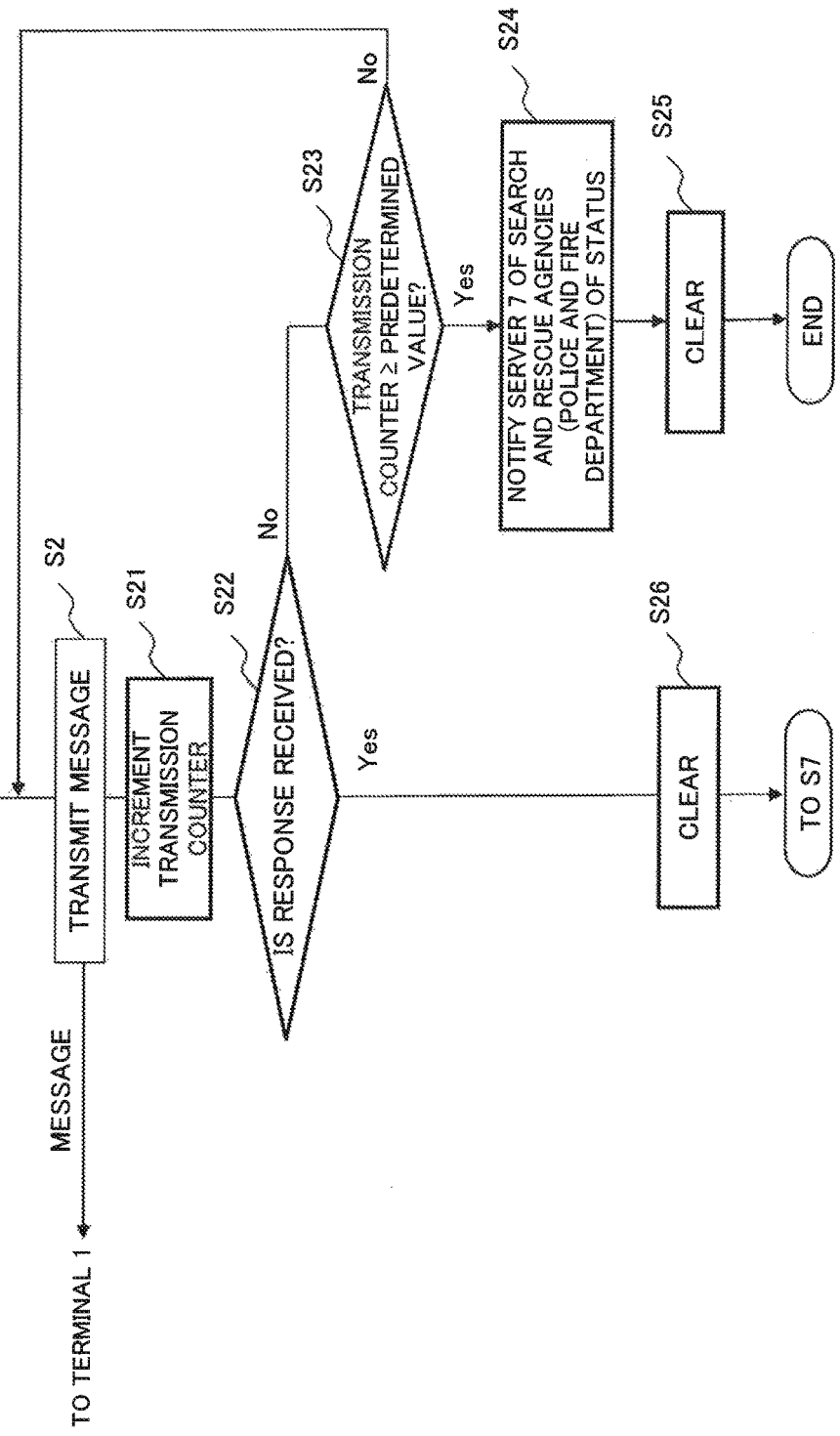
Fig. 9 FLOWCHART FOR EXPLAINING OPERATION (OPERATION FOR CONFIRMING PRESENCE OR ABSENCE OF RESPONSE) IN SYSTEM ACCORDING TO SECOND EXAMPLE EMBODIMENT

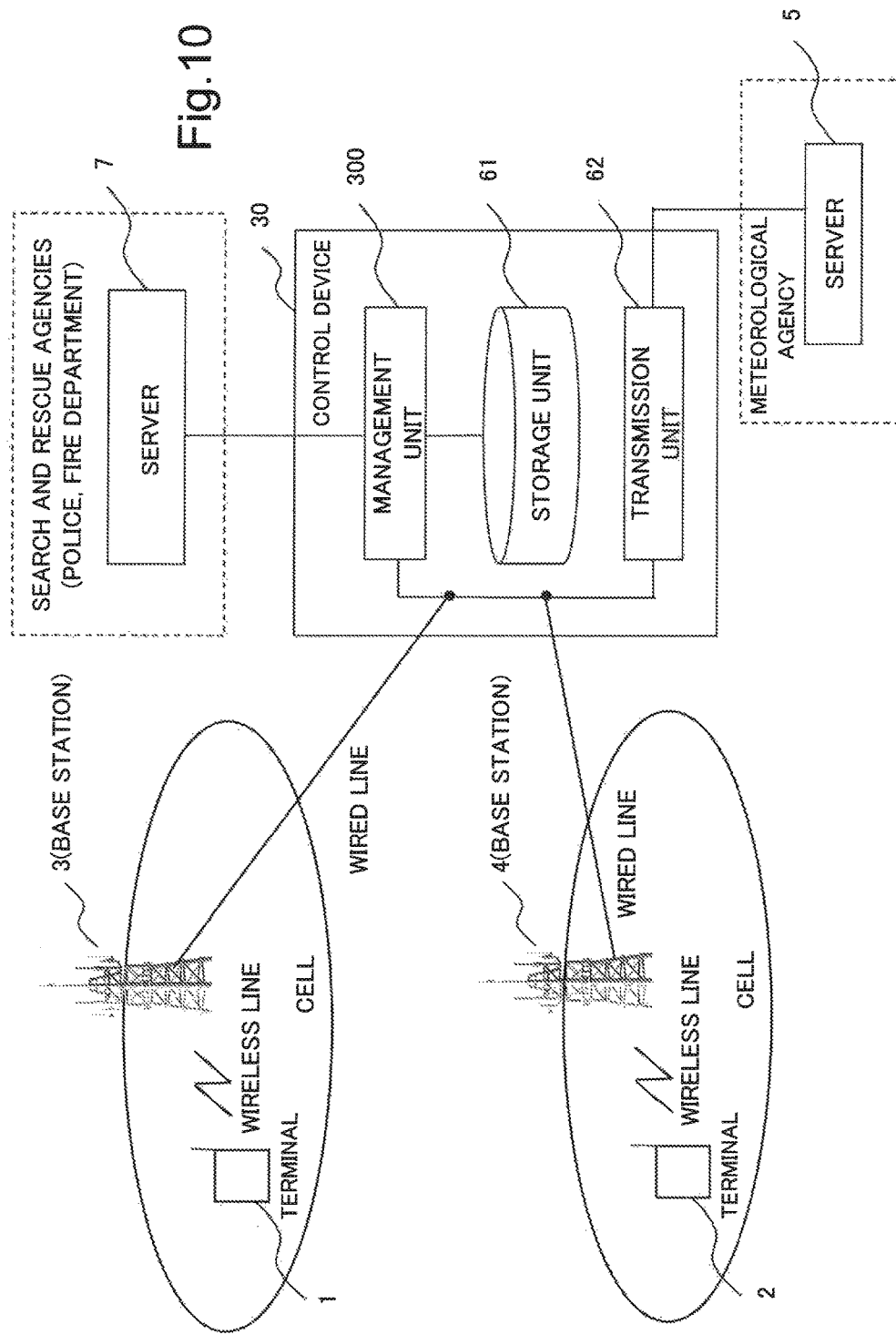

Fig.11

| BASE STATION NUMBER | EVACUATION RELATED INFORMATION | | AREA NAME |
|---|---|---|---|
| | EVACUATION LOCATION | ROUTE (WAY) TO EVACUATION LOCATION | |
| BASE STATION3 | ○○ELEMENTARY SCHOOL | ADVANCE TOWARD CITY CENTER ALONG △△ STREET AND TURN RIGHT AT ×× | 3-CHOME, SHIBA |
| BASE STATION4 | □□CIVIC CENTER | GO STRAIGHT ALONG ROAD IN FRONT OF ◇◇ STATION | 5-CHOME, SHIBA |
| ⋮ | ⋮ | ⋮ | ⋮ |

ONE EXAMPLE OF EVACUATION RELATED INFORMATION TABLE INCLUDED IN SYSTEM ACCORDING TO THIRD EXAMPLE EMBODIMENT

Fig. 12

| NAME | PHONE NUMBER | BASE STATION NUMBER | DETERMINATION RESULT |
|---|---|---|---|
| XXTARO | 090—xxxx—xxxx | NUMBER INDICATING BASE STATION 3 | SAFE |
| △△HANAKO | 090—zzzz—zzzz | NUMBER INDICATING BASE STATION 3 | NOT CONFIRMED AS ALIVE |
| OOSABURO | 090—yyyy—yyyy | NUMBER INDICATING BASE STATION 4 | SAFE |
| ... | ... | ... | ... |

ONE EXAMPLE OF RESULT RECORDING TABLE INCLUDED IN SYSTEM ACCORDING TO THIRD EXAMPLE EMBODIMENT

FLOWCHART FOR EXPLAINING OPERATION (OPERATION BETWEEN CONTROL DEVICE AND BASE STATION) IN SYSTEM ACCORDING TO THIRD EXAMPLE EMBODIMENT

Fig. 16

| AREA NAME | NUMBER OF PEOPLE NOT CONFIRMED AS ALIVE |
|---|---|
| 3-CHOME, SHIBA | 120 PEOPLE |
| 5-CHOME, SHIBA | 20 PEOPLE |
| ... | ... |

ONE EXAMPLE OF NUMBER-OF-PEOPLE-NOT-CONFIRMED-AS-ALIVE SUMMARY LIST INCLUDED IN SYSTEM ACCORDING TO THIRD EXAMPLE EMBODIMENT

Fig.17

| AREA NAME | NUMBER OF PEOPLE NOT CONFIRMED AS ALIVE | DAMAGE LEVEL (NUMBER OF PEOPLE NOT CONFIRMED AS ALIVE/NUMBER OF TERMINALS) |
|---|---|---|
| 3-CHOME, SHIBA | 120 PEOPLE | 20%(=120 PEOPLE/600 PEOPLE×100) |
| 5-CHOME, SHIBA | 20 PEOPLE | 100%(=20 PEOPLE/20 PEOPLE×100) |
| ... | ... | ... |

ONE EXAMPLE OF NUMBER-OF-PEOPLE-NOT-CONFIRMED-AS-ALIVE SUMMARY LIST INCLUDED IN SYSTEM ACCORDING TO THIRD EXAMPLE EMBODIMENT

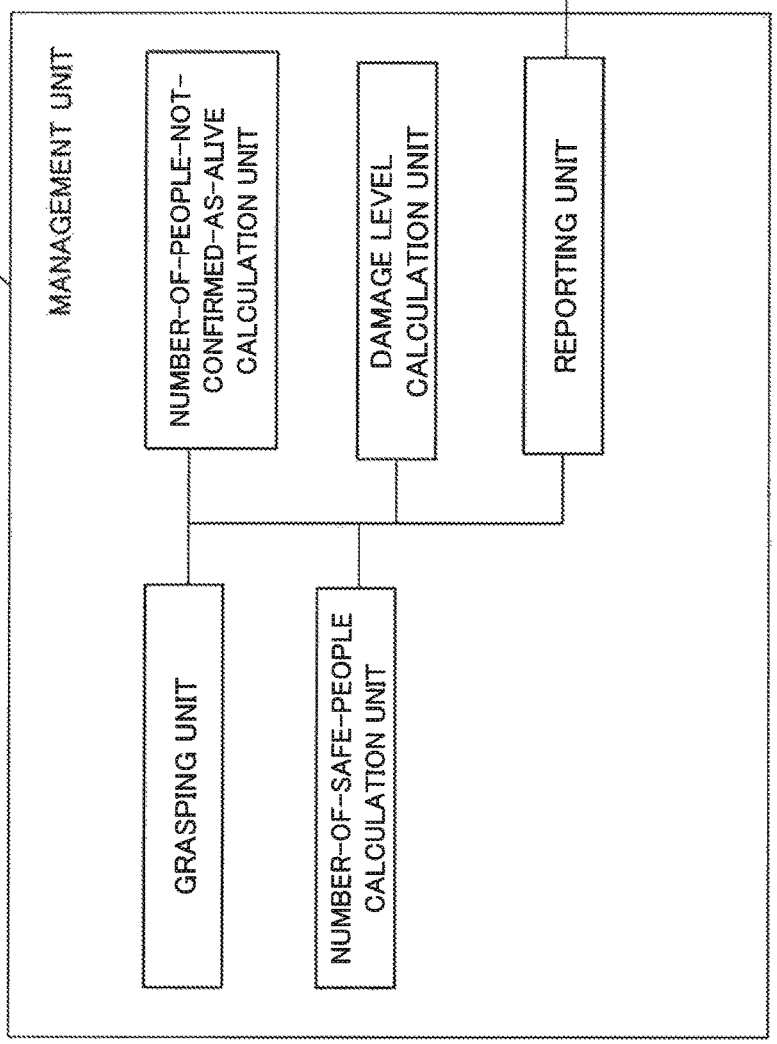

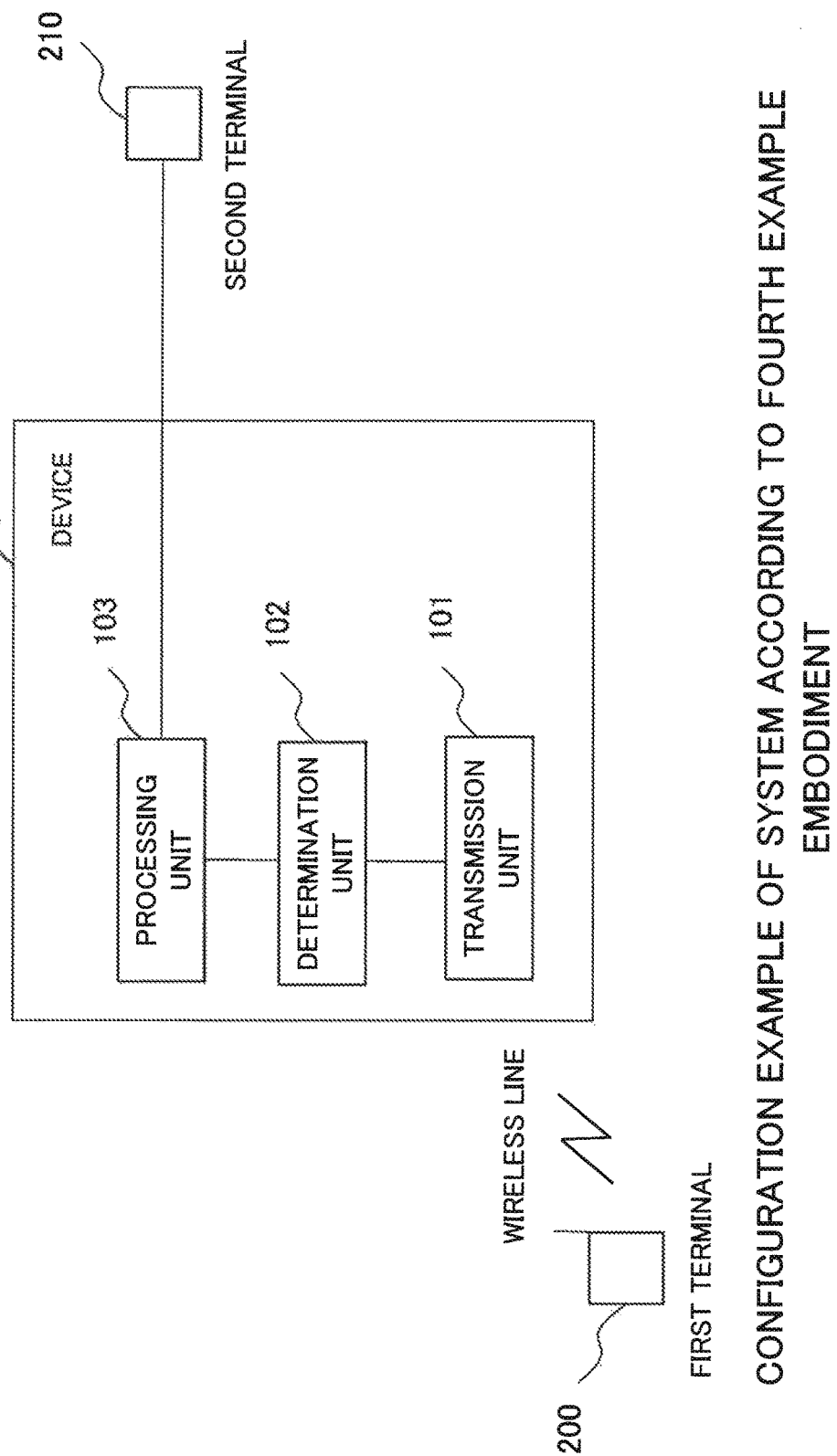

DEVICE AND NOTIFICATION METHOD

This application is a National Stage Entry of PCT/JP2016/003751 filed on Aug. 17, 2016, which claims priority from Japanese Patent Application 2015-161713 filed on Aug. 19, 2015, the contents of all of which are incorporated herein by reference, in their entirety.

TECHNICAL FIELD

The present invention relates to a device and a notification method, more particularly, to a device and a notification method for notifying disaster information.

BACKGROUND ART

In general, a safety confirmation system for notifying safety information which is one of disaster occurrences is known. A safety confirmation system is disclosed in PTL 1 described below.

The safety confirmation system in PTL 1 includes a portable terminal 91, a portable terminal 92, a disaster information delivery server 93, and a positional information acquisition server 94. The portable terminal 91 has a global positioning system (GPS) function. The disaster information delivery server 93 delivers an earthquake early warning issued by the Meteorological Agency to each portable terminal.

Upon receiving the earthquake early warning from the disaster information delivery server 93, the portable terminal 91 acquires current positional information by using the GPS function, and transmits, to the positional information acquisition server 94, a safety information mail obtained by adding a number (phone number) of the portable terminal 91 and a password to the acquired current positional information. The positional information acquisition server 94 stores the safety information mail received from the portable terminal 91. To the portable terminal 92, the phone number of the portable terminal 91 and the password are input by a user who wishes to inquire about safety of a user of the portable terminal 91. The portable terminal 92 sends the input phone number of the portable terminal 91 and the password to the positional information acquisition server 94. The positional information acquisition server 94 performs access authentication, based on the phone number of the portable terminal 91 and the password input from the portable terminal 92, and extracts current positional information about the portable terminal 91 from the stored safety information mail of the portable terminal 91. The positional information acquisition server 94 sends the extracted positional information about the portable terminal 91 to the portable terminal 92 as safety information.

With the configuration and operation described above, the safety confirmation system in PTL 1 can notify the portable terminal 92, which has inquired about safety information, of the safety information about a user of the portable terminal 91.

CITATION LIST

Patent Literature

[PTL 1] Japanese Laid-open Patent Application Publication No. 2013-187580

SUMMARY OF INVENTION

Technical Problem

However, the safety confirmation system in PTL 1 has a problem that it is impossible to notify, with high reliability, a user of a portable phone 92 that a user of a portable phone 91 is safe.

This is because the positional information acquisition server 94 in the safety confirmation system in PTL 1 sends, to the portable terminal 92, information that is not voluntarily returned back by a user of the portable phone 91, as safety information. Even when the portable phone 91 automatically returns back information regardless of whether the user is alive or not, the positional information acquisition server 94 in PTL 1 sends the returned information to the portable terminal 92 as safety information. As a result, the safety confirmation system in PTL 1 cannot notify, with high reliability, a user of the portable phone 92 that a user of the portable phone 91 is safe. In other words, the safety confirmation system in PTL 1 has a problem that it is impossible to provide, with high reliability, a service associated with safety of a user 91 of the portable phone.

In addition, the safety confirmation system in PTL 1 does not provide any information indicating an area that is heavily damaged upon occurrence of a disaster. As a result, the safety confirmation system in PTL 1 also has a problem that it is impossible for agencies such as a fire department and police to narrow down areas in which rescue activities are developed.

The present invention aims to provide a device and a notification method that solves the above-described problems.

Solution to Problem

To achieve the above-described object, a device of the present invention comprises: a transmission means for transmitting, to a first terminal to be connected, on a predetermined occasion associated with occurrence of a disaster, a signal for prompting to send a reply by a voluntary operation; a determination means for determining whether or not the information transmitted from the first terminal in response to the transmission is voluntary information transmitted by the voluntary operation performed by a user of the first terminal; and a processing means for performing predetermined processing associated with safety of a user of the first terminal when the determination means determines that the information is the voluntary information.

To achieve the above-described object, a notification method of the present invention comprises: transmitting, to a first terminal to be connected, on a predetermined occasion associated with occurrence of a disaster, a signal for prompting to send a reply by a voluntary operation; determining whether or not the information transmitted from the first terminal in response to the transmission is voluntary information transmitted by the voluntary operation performed by a user of the first terminal; and performing predetermined processing associated with safety of a user of the first terminal when it is determined in the determination that the information is the voluntary information.

Advantageous Effects of Invention

According to the present invention, a system can provide a service related to safety of a user of a terminal, with high reliability. For example, the system according to the present invention can provide a service for notifying, with high reliability, a family of a user of a terminal that the user is safe.

BRIEF DESCRIPTION OF DRAWINGS

FIG. 2 is a diagram illustrating one example of a registration table set to a control device of the system according to the first example embodiment of the present invention.

FIG. 3 is a flowchart for explaining an operation (operation of the control device) in the system according to the first example embodiment of the present invention.

FIG. 4 is a flowchart for explaining an operation (operation between the control device and a terminal) in the system according to the first example embodiment of the present invention.

FIG. 5 is a flowchart for explaining an operation (a pre-registration confirmation operation of the control device) in the system according to the first example embodiment of the present invention.

FIG. 6 is a diagram illustrating a configuration example of a system according to a second example embodiment of the present invention.

FIG. 7 is a diagram illustrating one example of an evacuation related information table set to a control device of the system according to the second example embodiment of the present invention.

FIG. 8 is a flowchart for explaining an operation (operation for providing evacuation related information) in the system according to the second example embodiment of the present invention.

FIG. 9 is a flowchart for explaining an operation (operation for confirming presence or absence of a response from a terminal) in the system according to the second example embodiment of the present invention.

FIG. 10 is a diagram illustrating a configuration example of a system according to a third example embodiment of the present invention.

FIG. 11 is a diagram illustrating one example of an evacuation related information table set to a control device of the system according to the third example embodiment of the present invention.

FIG. 12 is a diagram illustrating one example of a result recording table stored in the control device of the system according to the third example embodiment of the present invention.

FIG. 16 is a table (No. 1) illustrating one example of a number-of-people-not-confirmed-as-alive summary list stored in the control device of the system according to the third example embodiment of the present invention.

FIG. 17 is a table (No. 2) illustrating one example of the number-of-people-not-confirmed-as-alive summary list stored in the control device of the system according to the third example embodiment of the present invention.

FIG. 18 is a diagram illustrating an example of a configuration of a management unit included in the control device of the system according to the third example embodiment of the present invention.

FIG. 19 is a diagram illustrating a configuration example of a system according to a fourth example embodiment of the present invention.

DESCRIPTION OF EMBODIMENTS

Next, example embodiments of the present invention will be described in detail with reference to the drawings.

<<First Example Embodiment>>

[Outline]

A system according to the present example embodiment transmits, to a terminal, a signal for prompting to send a reply by a voluntary operation during a disaster, and confirms if information returned from the terminal (the information is hereinafter referred to as "response information") is information returned by the voluntary operation performed by a user of the terminal (the information is hereinafter referred to as "voluntary information"). If the response information is the voluntary information, it is highly likely that the user of the terminal is safe, and thus the system according to the present example embodiment notifies a terminal owned by the family of the user that the user of the terminal is safe. The system according to the present example embodiment can provide a service for notifying, with high reliability, the family of the user of the terminal that the user of the terminal is safe.

The configuration, function, and operation of the system according to the first example embodiment of the present invention will be described below.

[Description of Configuration]

Figure 1:
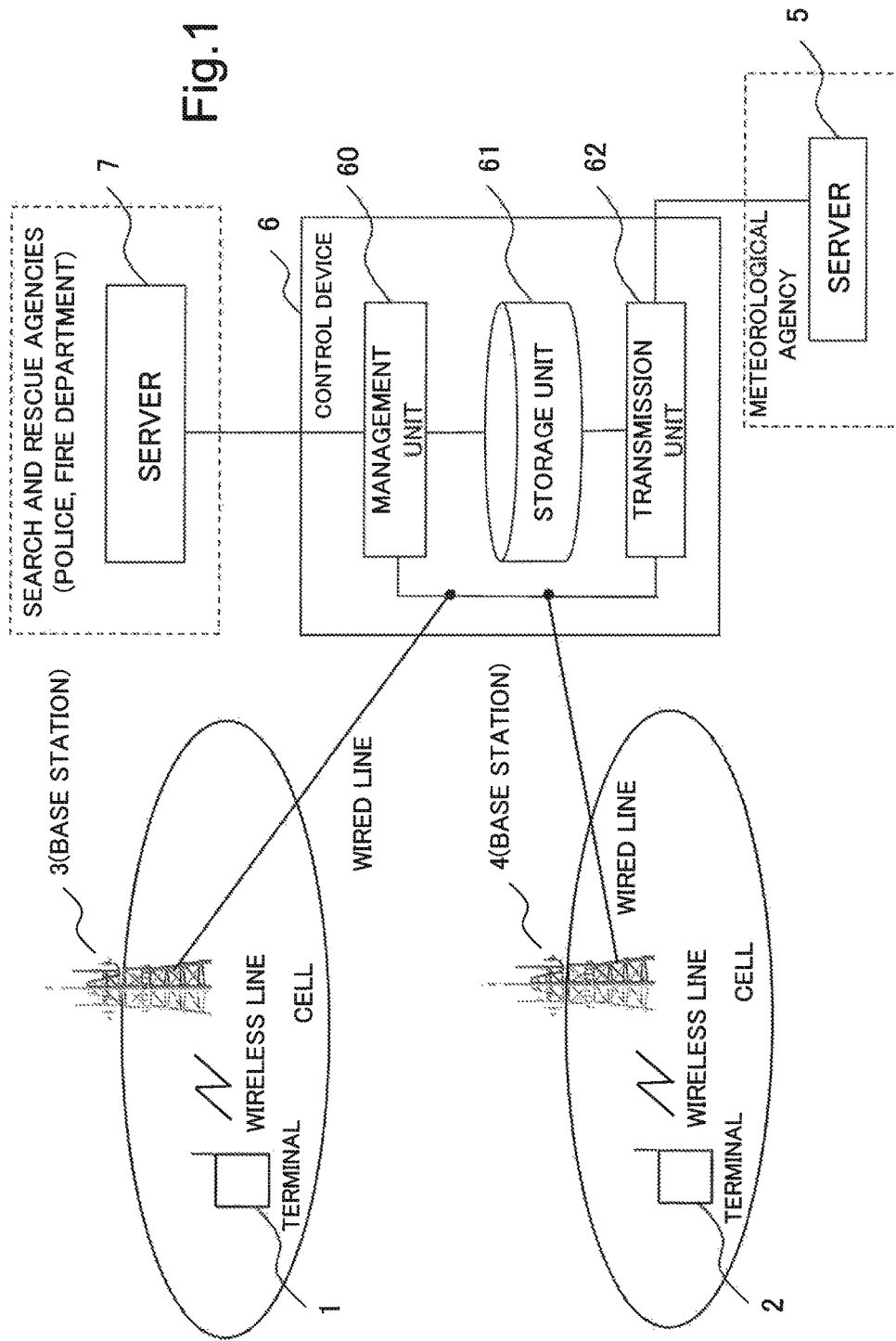
FIG. 1 is a diagram illustrating a configuration example of a system according to a first example embodiment of the present invention.

First, the configuration and functions of the system according to the first example embodiment of the present invention will be described. FIG. 1 is a diagram illustrating a configuration example of the system according to the first example embodiment of the present invention.

(1) Configuration of the System According to the First Example Embodiment of the Present Invention The system according to the present example embodiment is a mobile communication system. As illustrated in FIG. 1, the system includes a terminal 1, a terminal 2, a base station 3, a base station 4, a server 5, a control device 6, and a server 7. The control device 6 includes a management unit 60, a storage unit 61, and a transmission unit 62. The control device 6 may be, for example, a Mobility Management Entity (MME) device.

(2) Functions of the Terminal 1

(2-1) Communication Function

The terminal 1 includes a function of communicating with the base station 3, as in a general smartphone. Specifically, the terminal 1 includes a communication function based on 3rd Generation Partnership Project (3GPP).

(2-2) Received Message Display Function

The terminal 1 receives, by the communication function described above, a message for prompting to send a reply by a voluntary operation. Upon receiving the above-mentioned message for prompting to send a reply, the terminal 1 notifies a user that the message is received by means of a voice, and displays the received message on a screen. The above-mentioned message for prompting to send a reply may include text such as "A large earthquake has occurred. Are you OK? If you are OK, please activate a safety confirmation application and press OK button displayed on the application to send a reply indicating that you are safe.". The above-mentioned voice may be replaced by a melody set by the user of the terminal 1.

(2-3) Reply Sending Function

In the terminal 1, a safety confirmation application is preliminarily installed by the manufacturer of the terminal. The above-mentioned safety confirmation application is software created in JAVA (registered trademark) language. When the safety confirmation application is activated, the safety confirmation application displays the OK button on the screen of the terminal 1. When the OK button is pressed, the safety confirmation application outputs a predetermined number 756 to the main body of the terminal 1. The predetermined number 756 is any number preliminarily set in the safety confirmation application by the manufacturer of the terminal 1.

Upon input of the number 756 from the safety confirmation application, the main body of the terminal 1 transmits a message indicating a response (hereinafter referred to as a "response message") to the base station 3. In this case, the main body of the terminal 1 transmits the response message including the number 756 and the phone number of the terminal 1.

(2-4) Function of Sending a Reply Including Text Information

The above-mentioned safety confirmation application may be software for also displaying a text input window. In this case, when the OK button is pressed, the safety confirmation application also outputs, to the main body of the terminal 1, text information input to the text input window. The main body of the terminal 1 transmits, to the base station 3, a response message including the input text information, the number 756, and the phone number of the terminal 1.

(3) Regarding the Terminal 2 and the Base Stations 3 and 4

The terminal 2 is a general smartphone owned by the family of the user of the terminal 1. The terminal 2 communicates with the base station 4.

The base stations 3 and 4 are base stations of a general mobile communication system. When transmitting a message to the control device 6, the base stations 3 and 4 transmit the message including the base station number of itself. The base station number is a number that is unique to each base station and set to each of the base stations 3 and 4 by an administrator of the system according to the present example embodiment.

(4) Regarding the Servers 5 and 7

The server 5 is a general Cell Broadcast Entity (CBE) disposed in the Meteorological Agency or the like, and delivers an earthquake early warning.

The server 7 is a general server installed in an agency such as fire department and police agencies (hereinafter referred to as "search and rescue agencies"). The server 7 includes a function of displaying information to be input.

(5) Functions of the Control Device 6

(5-1) Pre-Registration Function

FIG. 2 is a diagram illustrating one example of a registration table set to the control device 6 of the system according to the first example embodiment of the present invention.

In the control device 6, a registration table is set by the administrator of the system according to the present example embodiment. As illustrated in FIG. 2, the registration table is a list in which a phone number, a name of the user who holds the terminal with the phone number, and a phone number of the terminal for notifying safety of the user (the phone number is hereinafter referred to as a "notification destination phone number") are associated with each other. The following description is made assuming that the administrator of the system according to the present example embodiment asks the user of the terminal 1 for confirmation of the phone number of the terminal 1, name, and notification destination phone number (the phone number of the terminal 2), and sets these pieces of information as the registration table in the control device 6. The control device 6 stores the set registration table.

(5-2) Earthquake Early Warning Delivery Function

The control device 6 delivers an earthquake early warning input from the server 5 to the terminal 1 through the base station 3.

(5-3) Message Transmission Function

After transmitting the earthquake early warning, the control device 6 transmits, to the terminal 1, a message for prompting to send a reply by a voluntary operation. The message for prompting to send a reply is as described above in "(2-1) received message display function".

(5-4) Message Reception and Determination Function

After transmitting the message for prompting to send a reply, a response message is input to the control device 6 from the terminal 1 through the base station 3.

The control device 6 determines whether the input response message is a message transmitted by the voluntary operation performed by the user of the terminal 1 (the message is hereinafter referred to as a "voluntary message"). Specifically, the control device 6 discriminates whether the input response message includes the number 756. When the response message includes the number 756, the user of the terminal 1 has voluntarily activated the application, and pressed the OK button to send a reply. When the response message includes the number 756, the control device 6 discriminates the response message as the voluntary message.

Note that, the number 756 is preliminarily set to the control device 6 by the administrator of the system according to the present example embodiment. The administrator of the system according to the present example embodiment asks the manufacturer of the terminal 1 what kind of number was set to the safety confirmation application.

(5-5) Safety Notification Function (Function of Notifying that the User is Safe)

When the response message is the voluntary message, the control device 6 extracts the phone number of the terminal 1 from the response message, and further extracts the phone number of the terminal 2 corresponding to the extracted phone number of the terminal 1 and the name of the user of the terminal 1 from the registration table. When the control device 6 extracts the name of the user of the terminal 1 and the like, the control device 6 transmits, to the terminal 2, safety information indicating that the user is safe as a short message. The control device 6 can use the extracted phone number of the terminal 2 as the destination of the short message.

(5-6) Safety Notification Function (Function of Notifying that it is Unknown Whether the User is Alive)

When the response message is not the voluntary message, the control device 6 first extracts the phone number of the terminal 1 from the response message, and further extracts the phone number of the terminal 2 corresponding to the extracted phone number of the terminal 1 and the name of the user of the terminal 1 from the registration table. The control device 6 also extracts the base station number from the response message. The control device 6 transmits the safety information, which indicates that it is unknown whether the user is alive and includes the extracted phone number of the terminal 1, the extracted name of the user of the terminal 1, and the extracted base station number, to the server 7 (the server of the search and rescue agencies such as the fire department and police). This is for the search and rescue agencies such as the fire department and police to recognize that the user of the terminal 1 is to be searched.

(5-7) Regarding Function Units Including Each Function

The storage unit 61 may include the above-described "(5-1) pre-registration function". The transmission unit 62 may include the above-described "(5-2) earthquake early warning delivery function" and "(5-3) message transmission function". The management unit 60 may include the functions of "(5-4) message reception and determination function" to "(5-6) safety notification function (function of notifying that it is unknown whether the user is alive)".

The above-described storage unit 61 can be realized by using a Random Access Memory (RAM). Further, the management unit 60 and the transmission unit 62 can be realized by using an electronic circuit, a processor such as a Central Processing Unit (CPU), and a RAM.

[Description of Operation]

FIGS. 3 and 4 are diagrams for explaining an operation in the system according to the first example embodiment of the present invention. The detailed operation in the system according to the present example embodiment will be described below with reference to FIGS. 3 and 4.

Note that, it is assumed that the storage unit 61 of the control device 6 stores the registration table illustrated in FIG. 2. Further, it is assumed that the terminal 1 is located near the epicenter of the earthquake and the terminal 2 owned by the family of the user of the terminal 1 is located in an area that is not affected by the earthquake.

(1) Message Acquisition Processing Related to Safety

First, it is assumed that an extremely large earthquake has occurred and an earthquake early warning has been delivered from the server 5 of the Meteorological Agency.

At that time, as illustrated in FIG. 3, the transmission unit 62 of the control device 6 transmits, to the terminal 1, which is subordinate to the base station 3, the earthquake early warning input from the server 5 (S1).

Specifically, the transmission unit 62 of the control device 6 transmits, to the base station 3, the earthquake early warning input from the server 5. The base station 3 transmits, to the terminal 1, the earthquake early warning received from the transmission unit 62.

Next, after transmitting the earthquake early warning, the transmission unit 62 of the control device 6 transmits, to the terminal 1, a message for prompting to send a reply by a voluntary operation (S2).

Specifically, as illustrated in FIG. 4, the transmission unit 62 of the control device 6 transmits, to the base station 3, a message for prompting to send a reply by a voluntary operation.

Next, the base station 3 transmits, to the terminal 1, a message for prompting to send a reply, by a voluntary operation (S3).

The above-mentioned "message for prompting to send a reply by a voluntary operation" may be a message including text such as "A large earthquake has occurred. Are you OK? If you are OK, please activate a safety confirmation application and press OK button displayed on the application to send a reply indicating that you are safe."

Next, upon receiving the message for prompting to send a reply from the base station 3, the terminal 1 notifies the user that the message is received by means of a voice, and displays the received message on the screen (S4).

Here, it is assumed that the user of the terminal 1 who has seen the above-described message activates the safety confirmation application and presses the OK button displayed by the safety confirmation application. When the OK button is pressed, the safety confirmation application outputs the number 756 to the main body of the terminal 1.

Upon input of the number 756 from the safety confirmation application, the main body of the terminal 1 transmits the response message including the input number 756 and the phone number of the terminal 1 to the base station 3 (S5).

Note that, the safety confirmation application may be an application that displays the text input window and the OK button and that outputs the text information input to the text input window and the number 756 to the main body of the terminal 1 when the OK button is pressed. In this case, the main body of the terminal 1 transmits, to the base station 3, the response message including the number 756, the phone number of the terminal 1, and the input text information (e.g., "I'm safe, so don't worry" etc.).

Next, upon receiving the response message, the base station 3 transmits the received response message including the base station number of the base station 3 to the control device 6 (S6).

Next, upon receiving the response message, the transmission unit 62 of the control device 6 stores the received response message in the storage unit 61 (S7).

(2) Processing for Determining Whether Message is Sent by a Voluntary Operation

After that, at a predetermined timing, the management unit 60 of the control device 6 acquires the response message stored in the storage unit 61, and as illustrated in FIG. 3, the management unit 60 discriminates whether the acquired response message is the voluntary message sent by the voluntary operation performed by the user of the terminal 1 (S8).

Specifically, the management unit 60 discriminates whether the acquired response message includes the number 756. When the response message includes the number 756, the user of the terminal 1 has voluntarily activated the application, and pressed the OK button to send a reply. When the response message includes the number 756, the control device 6 can discriminate that the response message is the voluntary message sent by the voluntary operation performed by the user of the terminal 1.

Note that, the above-mentioned predetermined timing is a timing at regular intervals, and may be set by the administrator of the system according to the present example embodiment.

(3) Processing to be Performed when the Response Message is a Message Sent by a Voluntary Operation Next, when the acquired response message is the voluntary message and the user of the terminal 1 voluntarily transmits the message (in the case of Yes in S8), the management unit 60 of the control device 6 transmits, to the terminal 2, safety information indicating that the user of the terminal 1 is safe (S9).

This is because when the user of the terminal 1 voluntarily transmits the message, it is highly likely that the user of the terminal 1 is safe.

The above-described step S9 is realized in such a manner that, specifically, the management unit 60 acquires the name of the terminal 1 and the phone number of the terminal 2 from the registration table or the like as described above in (5-5), and transmits, to the base station 4, the acquired name and the safety information indicating that the user is safe as a short message. The above-mentioned short message is a short message directed to the terminal 2 (directed to the acquired phone number of the terminal 2). The management unit 60 of the control device 6 may transmit the above-mentioned short message including the text information (e.g., "I'm safe, so don't worry." etc.) included in the response message and the base station number.

Note that, although not illustrated, the base station 4 transmits, to the terminal 2, the short message received from the control device 6, and the terminal 2 displays the message. The user of the terminal 2 who has seen the name of the terminal 1 and information indicating that the user is safe can recognize that the user of the terminal 1 is safe.

(4) Processing to be Performed when the Response Message is not a Message Sent by a Voluntary Operation On the other hand, when the acquired response message is not the voluntary message (in the case of No in S8), the management unit 60 cannot confirm that the user of the terminal 1 is safe, and thus transmits, to the server 7 of the search and rescue agencies, the safe information indicating that it is unknown whether the user is alive (S10).

The above-mentioned "safety information indicating that it is unknown whether the user is alive" includes information associated with the terminal 1 (specifically, the name of the user of the terminal 1, the phone number of the terminal 1, and the base station number of the base station to which the terminal 1 is connected). The management unit 60 can acquire the information associated with the terminal 1 as described in "(5-6) safety notification function (function of notifying that it is unknown whether the user is alive).

Although not illustrated, upon receiving the safety information, the server 7 displays the information associated with the terminal 1 included in the safety information on the screen. This is for the purpose of allowing the search and rescue agencies such as the fire department and police to recognize a person to be searched, or an area to be searched (a cell subordinate to the base station indicated by the base station number, etc.).

Next, after S10, the management unit 60 of the control device 6 also transmits to the terminal 2 safety information indicating that it is unknown whether the user is alive (S11).

The management unit 60 of the control device 6 may transmit, to the terminal 2, the safety information indicating that it is unknown whether the user is alive, as a short message, as in S9. In this case, the management unit 60 acquires the name of the terminal 1 and the phone number of the terminal 2 from the registration table or the like, and transmits, to the terminal 2, the acquired name and the safety information indicating that it is unknown whether the user is alive, as a short message. The destination of the short message is the phone number of the terminal 2.

(5) Regarding Information Included in the Response Message

In the above-mentioned step S5, the terminal 1 transmits the response message including information such as the number 756 and text information to the base station 3, but instead may transmit the response message together with other information as well.

For example, as long as the terminal 1 includes a Global Positioning System (GPS) function, the terminal 1 may measure current positional information by the GPS function when the number is input from the safety confirmation application, and may include the measured positional information in the response message. Further, when the terminal 1 includes a general camera function, the terminal 1 may activate the camera function to capture a moving image when the number is input from the safety confirmation application, and may transmit the response message including the captured moving image file. In S9 or S11, the management unit 60 of the control device 6 transmits, to the terminal 2, the positional information and moving image file included in the response message received from the terminal 1. The user of the terminal 2 can recognize the current location of the user of the terminal 1, and can also confirm the status in the vicinity of the user of the terminal 1 in a moving image.

(6) Another Determination Method for Determining Whether a Message is Sent by a Voluntary Operation As a method for discriminating whether the response message is the voluntary message sent by the voluntary operation performed by the user of the terminal 1, a method of discriminating whether the number 756 is included in the response message has been described above. However, the present invention is not limited to this method.

The management unit 60 of the control unit 60 discriminates whether predetermined information that is likely to be obtained by the voluntary operation performed by the user of the terminal 1 is included in the response message, thereby discriminating whether the response message is the voluntary message.

For example, the management unit 60 of the control unit 60 may discriminate whether the response message includes the predetermined information selectively input by the user of the terminal 1. The predetermined information is set to the management unit 60 by the administrator of the system according to this example embodiment.

Further, the control unit 60 may discriminate whether the response message includes audio data representing predetermined words. In this case, the terminal 1 includes microphone and recording functions. When a message for prompting to send a reply by a voluntary operation is input, the terminal 1 provides an audio guidance and prompts the user to speak a predetermined word with a microphone. The audio guidance is set to the terminal 1 by the manufacturer of the terminal 1. The terminal 1 causes the recording function to operate for a certain period of time after the audio guidance is finished, and transmits the response message including the recorded audio data to the base station 3. The management unit 60 of the control device 6 uses well-known speech recognition software to analyze the audio data included in the response message to recognize what kind of words are represented by the audio data. When a result of the analysis indicates that the audio data included in the response message includes the audio data representing the predetermined words, the management unit 60 of the control device 6 discriminates that the response message is the voluntary message sent by the voluntary operation performed by the user of the terminal 1. The audio data representing the predetermined words is set to the management unit 60 by the administrator of the system according to the present example embodiment. The administrator of the system according to the present example embodiment sets the audio data representing the words that are prompted by the audio guidance of the terminal 1 to the management unit 60.

(7) Pre-Registration Confirmation Processing

FIG. 5 is a flowchart for explaining an operation (operation for confirming pre-registration of the control device 6) in the system according to the first example embodiment of the present invention.

The management unit 60 of the control device 6 may perform processing for confirming whether the phone number of the terminal which notifies the safety of the user corresponds to the phone number (i.e., notification destination phone number) is registered in the registration table.

Specifically, as illustrated in FIG. 5, the management unit 60 of the control device 6 may extract the phone number from the response message after the determination in S8, and may confirm whether the notification destination phone number corresponding to the extracted phone number is present on the registration table (S13, S14). In the determination in S13, when the notification destination phone number corresponding to the extracted phone number is present on the registration table (in the case of Yes in S13), the management unit 60 performs the above-described step S9, and when the notification destination phone number is not present (in the case of No in S13), the management unit 60 terminates the processing. Similarly, in the determination in S14, when the notification destination phone number corresponding to the extracted phone number is present on the registration table (in the case of Yes in S14), the management unit 60 performs the above-described step S11, and when the notification destination phone number is not present (in the case of No in S14), the management unit 60 performs the processing of S10.

(8) Regarding Terminals

The system according to the present example embodiment may include a plurality of terminals other than the terminals 1 and 2. In this case, the transmission unit 62 of the control device 6 carries out S2 for each terminal after the earthquake early warning is delivered, and transmits, to each terminal, a message for prompting to send a reply. The storage unit 62 of the control device 6 includes the registration table in which the phone numbers of the respective terminals and the notification destination phone numbers associated with the terminals are associated with each other.

Upon receiving the response messages after transmitting the message for prompting to send a reply, the transmission unit 62 of the control device 6 stores the response messages in the storage unit 61. At a predetermined timing, the management unit 60 of the control device 6 carries out the above-described steps S8 to S11 for each of the response messages stored in the storage unit 61, and notifies the terminal corresponding to the notification destination phone number registered in the registration table whether the user of the terminal that has sent the response message is safe.

[Description of Advantageous Effects]

According to the present example embodiment, the system can provide a service for notifying, with high reliability, the user of the terminal 2 that the user of the terminal 1 is safe.

This is because, in the system according to the present example embodiment, the control device 6 transmits, to the terminal 1, a signal for prompting to send a reply by a voluntary operation, and discriminates whether the information transmitted from the terminal 1 in response to the transmission is information transmitted by the voluntary operation performed by the user. If the information sent from the terminal 1 is the information sent by the voluntary operation, it is highly likely that the user of the terminal 1 is safe. The execution of the above-described discrimination processing enables the system according to this example embodiment to discriminate, with high reliability, whether the user of the terminal 1 is safe, and to notify the user of the terminal 2 that the user of the terminal 1 is safe. That is, the system according to the present example embodiment can provide a service for notifying, with high reliability, the user of the terminal 2 (e.g., the family of the user) that the user of the terminal 1 is safe.

<<Second Example Embodiment>>

Next, a second example embodiment of the present invention will be described.

A system according to the second example embodiment is a system that provides a terminal which has transmitted a response message with evaluation related information such as an evacuation location or a route to an evacuation location. The user of the terminal of the system according to the second example embodiment that is provided with the evacuation related information can evacuate to an evacuation location more smoothly than the user of the terminal of the system according to the first example embodiment.

Further, the system according to the second example embodiment transmits the message for prompting to send a reply to the terminals a plurality of times, and if there is a terminal which has not sent a response message, the system notifies the server of the search and rescue agencies, such as the fire department and police, that it is unknown whether the user of the terminal is alive.

The configuration and operation of the system according to the second example embodiment will be described below. FIG. 6 is a diagram illustrating a configuration example of the system according to the second example embodiment of the present invention.

[Description of Configuration]

(1) Configuration of the System According to the Second Example Embodiment

The system according to the second example embodiment includes a control device 20 instead of the control device 6 as illustrated in FIG. 6. The control device 20 includes a management unit 200 and a transmission unit 202 instead of the management unit 60 and the transmission unit 62, respectively.

(2) Functions of the Management Unit 200

FIG. 7 is a diagram illustrating one example of an evacuation related information table set to the control device 20.

As illustrated in FIG. 7, the management unit 200 of the control device 20 is preliminarily set the evacuation related information table in which the base station numbers and evacuation related information are associated with each other by the administrator of the system according to the present example embodiment. The evacuation related information includes an evacuation location in the vicinity of the base station indicated by the base station number, and route information to the evacuation location. The management unit 200 stores the set evacuation related information table.

The management unit 200 transmits, to the terminal which has transmitted a response message to the management unit, evaluation related information indicated in a transmitted evacuation related information table associated with the terminal. Specifically, the management unit 200 extracts the phone number and the base station number from the received response message, and obtains the evacuation related information corresponding to the extracted base station number from the transmitted evacuation related information table. The management unit 200 transmits the obtained evacuation related information to the terminal corresponding to the extracted phone number.

(3) Functions of the Transmission Unit 202

The transmission unit 202 may include a function of transmitting, to the server 7 of the search and rescue agencies such as the fire department or police, information indicating that it is unknown whether the user of the terminal 1 is alive, when the terminal 1 has not sent a response message even after the message for prompting to send a reply is transmitted to the terminal 1 a predetermined number of times.

To realize the above-described function, the transmission unit 202 includes a counter (hereinafter referred to as a "transmission counter") to count the number of times of transmitting the message for prompting to send a reply. An initial value of the transmission counter is 0.

Further, the transmission unit 202 includes a flag (hereinafter referred to as a "reception flag") indicating whether the response message is received or not. The transmission unit 202 includes a function of setting "1" to the reception flag upon receiving the response message after transmitting the message for prompting to send a reply (the function is hereinafter referred to as a "response message reception detection function"). The response message reception detection function is a function to be carried out in preference to other functions. An initial value for the reception flag is 0.

Functions of the transmission unit 202 other than the above-described functions will be described in detail in [Description of Operation] described below.

The configuration and functions other than those described above are the same as those of the system according to the first example embodiment. Accordingly, the same components are indicated by the same reference signs and the descriptions thereof are omitted.

[Description of Operation]

Next, an operation of the system according to the present example embodiment will be described. FIGS. 8 and 9 are flowcharts for explaining the operation of the system according to the second example embodiment of the present invention.

(1) Operation for Providing Evacuation Related Information

First, as illustrated in FIG. 8, the management unit 200 of the control device 20 transmits to the terminal which has transmitted the response image after S9 (the terminal owned by the user who is safe) the evacuation related information associated with the terminal (S20).

Specifically, the management unit 200 of the control device 20 extracts the phone number and the base station number from the response message acquired in S8, and obtains the evacuation related information corresponding to the extracted base station number from the transmitted evacuation related information table. The management unit 200 of the control device 20 transmits the extracted evacuation related information to the terminal corresponding to the extracted phone number. In that case, the management unit 200 of the control device 20 may transmit the extracted evacuation related information as a short message addressed to a target phone number.

The terminal which has received the evacuation related information (e.g., the terminal 1) displays the evacuation location and evacuation route included in the evacuation related information on the screen. The user of the terminal 1 can recognize the evacuation location and route and thus evacuate smoothly. Note that, the evacuation related information may also include information indicating a spot for charging the terminal. The user of the terminal 1 can search a charging spot rapidly when the battery of the terminal has almost run out after the evacuation to the evacuation location.

(2) Operation for Transmitting Messages a Plurality of Times

The transmission unit 202 of the control device 20 repeatedly transmits, to the terminal 1, the message for prompting to send a reply, and when the transmission unit 202 has not received a response message even after transmitting the message predetermined times, the transmission unit 202 may transmit, to the server 7 of the search and rescue agencies, safety information indicating that it is unknown whether the user of the terminal 1 is alive.

Accordingly, the transmission unit 202 of the control device 20 may operate as follows.

First, as illustrated in FIG. 9, when the transmission unit 202 of the control device 20 carries out S2 and transmits, to the terminal 1, the message for prompting to send a reply, the transmission unit 202 increments the transmission counter by "1" (S21) so as to count the number of times of transmission.

Next, after a lapse of a predetermined time, the transmission unit 202 of the control device 20 discriminates whether the response message is received (S22).

Specifically, the transmission unit 202 uses the response message reception detection function described above in "(3) functions of the transmission unit 202" to discriminate whether the reception flag is set to "1" after a lapse of a predetermined time. The predetermined time is set to the transmission unit 202 by the administrator of the system according to the present example embodiment. In general, the administrator of the system according to the present example embodiment measures a time required for transmitting the message for prompting to send a reply and usually receiving a response message, and sets, to the transmission unit 202, a time longer than the measured time as the predetermined time.

Next, when the transmission unit 202 of the control device 20 has not received the response message even after a lapse of the predetermined time (in the case of No in S22), that is, when the reception flag remains "0", the transmission unit 202 discriminates whether the value of the transmission counter is equal to or greater than a predetermined value (S23).

Next, when the value of the transmission counter is not equal to or greater than the predetermined value (in the case of No in S23), the transmission unit 202 of the control device 20 carries out S2 again and transmits, to the terminal 1, the message for prompting to send a reply.

After that, the processing of S2 and S21 to S23 is repeatedly carried out until the transmission unit 202 transmits the message for prompting to send a reply and receives the response message, or until the value of the transmission counter becomes equal to or greater than the predetermined value.

After that, when the value of the transmission counter is equal to or greater than the predetermined value (in the case of Yes in S23), the transmission unit 202 does not transmit, to the terminal 1, more messages for prompting to send a reply, and transmits, to the server 7, that it is unknown whether the user of the terminal 1 is alive as a message (S24). Specifically, the transmission unit 202 transmits, to the server 7, the phone number of the terminal 1 and safety information indicating that it is unknown whether the user is alive. The phone number of the terminal 1 may be preliminarily set to the transmission unit 202 by the administrator of the system according to the present example embodiment.

Next, the transmission unit 202 initializes the transmission counter and the reception flag to "0", and waits until the earthquake early warning delivery is input from the server 5 (S25).

On the other hand, when receiving the response message in S22 (in the case of Yes in S22), that is, when the reception flag indicates "1", the transmission unit 202 of the control device 20 initializes the transmission counter and the reception flag to "0" (S26) and carries out the processing of step S7 described above.

(3) Regarding the Management Unit 200

The management unit 200 may be composed of two units, i.e., a determination unit and a notification unit. In this case, the determination unit performs the above-described processing of step S8 that is carried out by the management unit 200, and the notification unit performs the above-described processing of steps S9 to S14 and S20 that are carried out by the management unit 200.

The other operations are similar to those of the first example embodiment, and thus detailed descriptions thereof are omitted.

(4) Regarding Phone Numbers

Note that, the above-described systems according to the first and second example embodiments use a phone number as an identifier of a terminal. However, the identifier is not limited to this. The system according to the present example embodiment may use a mail address instead of a phone number. Alternatively, the system according to the present example embodiment may use My Number (individual number) instead of a phone number, as long as My Number will be used as the identifier for a terminal in the future.

[Description of Advantageous Effects]

According to the present example embodiment, the system can notify, with high reliability, the user of the terminal 2 that the user of the terminal 1 is safe, like in the system according to the first example embodiment. This is because the control device 20 in the system according to the present example embodiment discriminates whether the response message sent from a terminal is a message sent by a voluntary operation performed by the user of the terminal, like in the control device 6 of the system according to the first example embodiment.

Furthermore, the system according to the present example embodiment provides a terminal with the evacuation related information such as an evacuation location and a route to the evacuation location. The provision of the evacuation related information enables the user of the terminal to evacuate to the evacuation location more smoothly than the user of the terminal in the system according to the first example embodiment.

Note that, the above-described discrimination processing enables the system according to the present example embodiment to transmit the evacuation related information to the terminal of the user who is safe with a high accuracy. Specifically, when the traffic is increasing due to a disaster, the system according to the present example embodiment can first transmit the evacuation related information to the user who can evacuate. The system according to the present example embodiment can provide a service for notifying the user who is safe with a high accuracy (the user who can evacuate) of the evacuation related information.

<<Third Example Embodiment>>

The control device 20 of the system according to the present example embodiment adds up the number-of-people-not-confirmed-as-alive for each area in the vicinity of the base station, and provides the search and rescue agencies such as the fire department and police with the add-up result. The search and rescue agencies such as the fire department and police can narrow down the areas in which search and rescue activities are carried out by, for example, preferentially carrying out search and rescue activities in areas in which the number-of-people-not-confirmed-as-alive is larger.

The configuration and operation of the system according to the third example embodiment will be described below. FIG. 10 is a diagram illustrating a configuration example of the system according to the third example embodiment of the present invention.

[Description of Configuration]

(1) Configuration of the System According to the Third Example Embodiment

As illustrated in FIG. 10, the system according to the third example embodiment includes a control device 30 instead of the control device 6. The control device 30 includes a management unit 300 instead of the management unit 60.

(2) Functions of the Management Unit 300

(2-1) Evacuation Related Information Table Storage Function

FIG. 11 is a diagram illustrating one example of the evacuation related information table set to the control device in the system according to the present example embodiment.

As illustrated in FIG. 11, an evacuation related information table is preliminarily set to the management unit 300 by the administrator of the system according to the present example embodiment. The evacuation related information table used herein has a configuration in which an area name is added to the evacuation related information table used in the system according to the second example embodiment. The area name represents the name of each place in the vicinity of the base station indicated by the base station number. The management unit 300 stores the set evacuation related information table.

(2-2) Safety Determination Result Storage Function

As in the management unit 60 in the system according to the first example embodiment, the management unit 300 includes the safety notification functions in (5-5) and (5-6) described above. The management unit 300 stores the phone number of each terminal, the name of the user of each terminal, determination results (information indicating whether the user is safe or information indicating that it is unknown whether the user is alive), and base station number, which are transmitted by the above-described functions (5-5) and (5-6), in association with each other as a table. The stored table is hereinafter referred to as a "result recording table".

(2-3) Damage Situation Calculation Function

After a lapse of a predetermined time after an earthquake early warning is delivered, the management unit 300 counts the number-of-people-not-confirmed-as-alive for each base station number registered in the result recording table, and stores, in an associated manner, the base station numbers and the counted number-of-people-not-confirmed-as-alive. The above method for counting the number of the people who are not confirmed as alive will be described in detail in [Description of Operation] described below. The predetermined time may be about several minutes, and is set to the management unit 300 by the administrator of the system according to the present example embodiment.

The management unit 300 transmits the stored base station numbers and counted number-of-people-not-confirmed-as-alive to the server 7.

The configuration and functions other than the configuration and functions described above are the same as those in the system according to the first example embodiment. Accordingly, the same components are indicated by the same reference signs and the descriptions thereof are omitted.

[Description of Operation]

Figure 13:
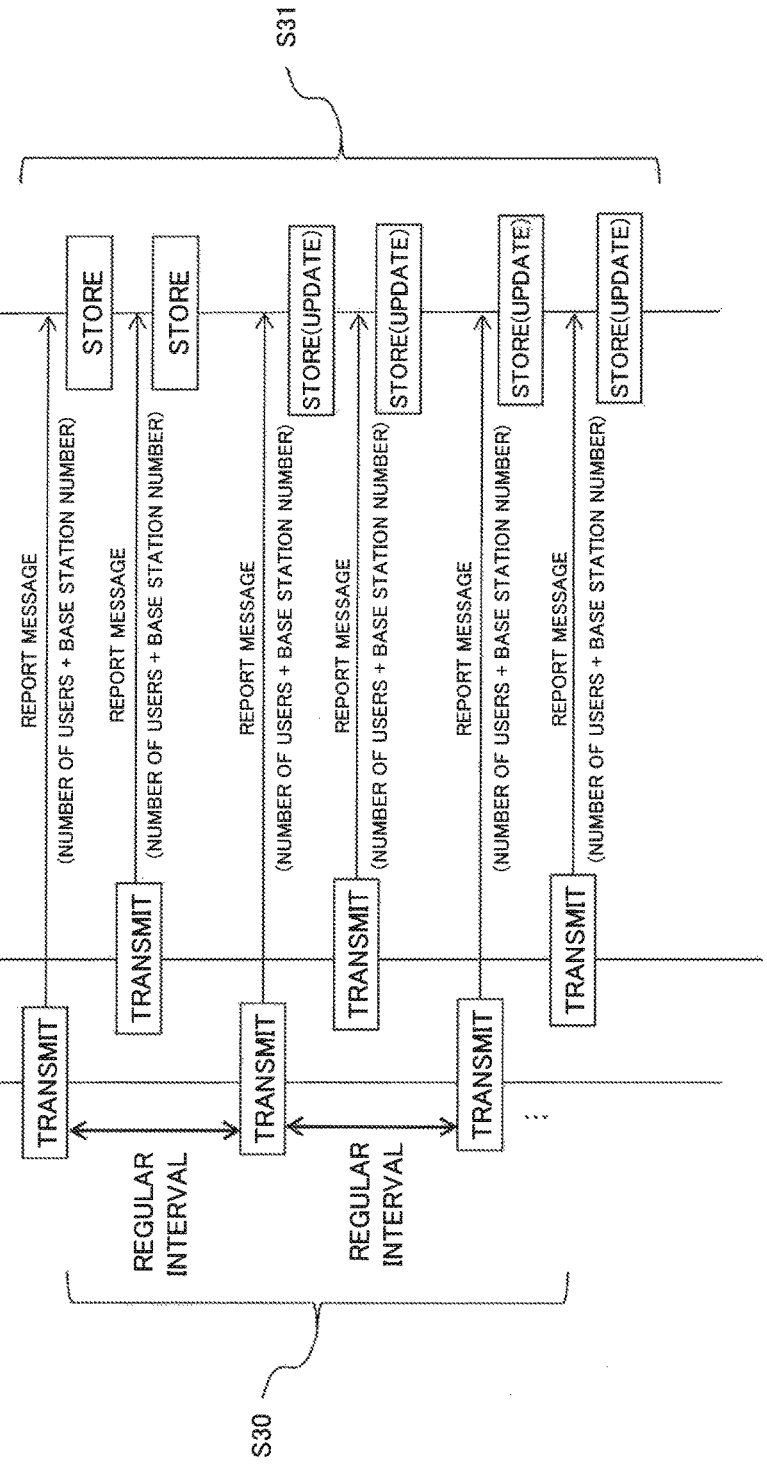
FIG. 13 is a flowchart for explaining an operation (an operation between the control device and a base station) in the system according to the third example embodiment of the present invention.
Figure 14:
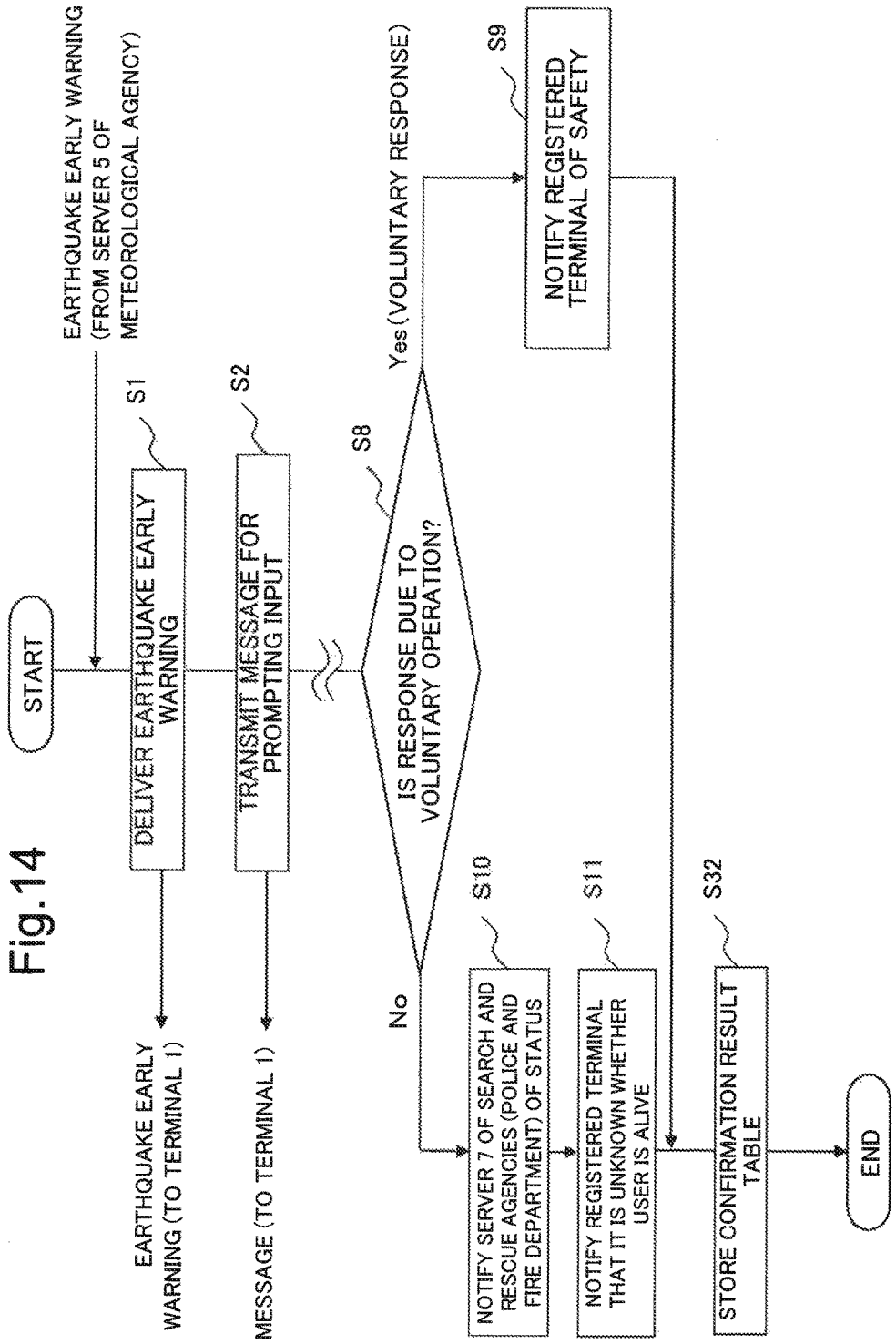
FIG. 14 is a flowchart for explaining an operation (an operation for storing the result recording table) in the system according to the third example embodiment of the present invention.
Figure 15:
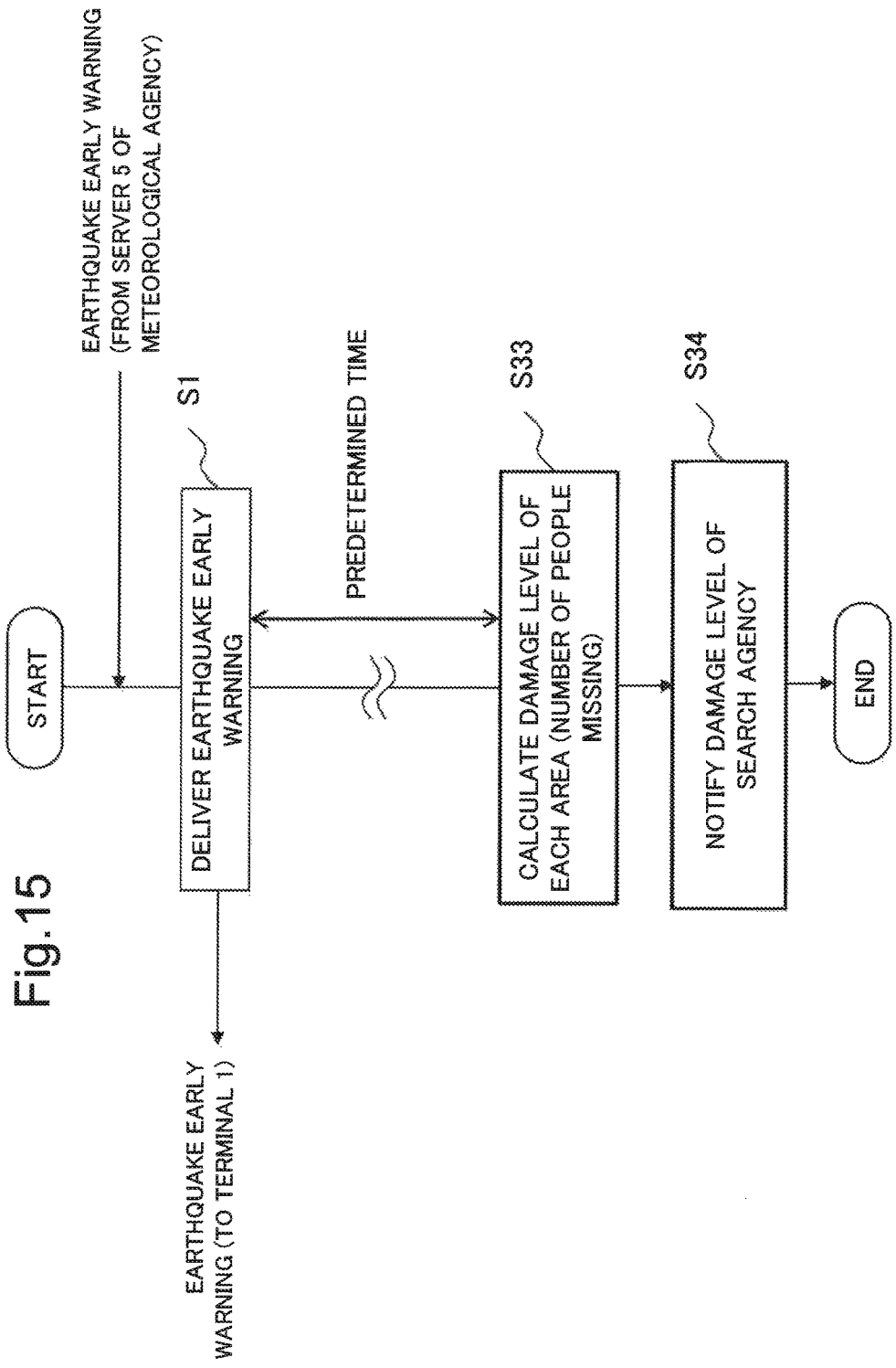
FIG. 15 is a flowchart for explaining an operation (an operation for grasping a damage situation) in the system according to the third example embodiment of the present invention.

Next, an operation of the system according to the present example embodiment will be described. FIG. 12 is a diagram illustrating one example of the result recording table stored in the control device of the system according to the third example embodiment of the present invention. FIGS. 13 to 15 are flowcharts for explaining the operation of the system according to the third example embodiment of the present invention.

(1) Processing for Grasping the Number of Terminals Before Occurrence of an Earthquake First, as illustrated in FIG. 13, at a predetermined timing, the base stations 3 and 4 output the number of terminals to be connected (hereinafter referred to as "the number of users") to the management unit 300 of the control device 30, as in a general base station (S30).

The above-mentioned predetermined timing is a timing at regular intervals, and is set to the base stations 3 and 4 by the administrator of the system according to the present example embodiment. Note that, the base stations 3 and 4 output the base station number of itself together with the number of users.

Next, the management unit 300 of the control device 30 stores, in an associated manner, the number of users and the base station number, every time the number of users and the base station number are input (S31). However, when S31 is carried out, the management unit 300 of the control device 30 updates the number of users corresponding to the base station number with the input number of users when the base station number that are the same as the input base station number are already stored.

Next, although not illustrated, the management unit 300 of the control device 30 holds, as information before occurrence of an earthquake, the number of users and the base station number stored at the time when the transmission unit 302 transmits the earthquake early warning (when S1 is carried out). The management unit 300 of the control device 30 may write the number of users and the base station number (i.e., information before occurrence of an earthquake) in a memory for holding information, and may hold the information before occurrence of an earthquake.

Further, the management unit 300 may detect that the transmission unit 302 has transmitted an earthquake early warning by receiving a message indicating that a flash report has been transmitted from the transmission unit 302. Upon transmitting the earthquake early warning, the transmission unit 302 transmits, to the management unit 300, the message indicating that a flash report has been transmitted.

Next, although not illustrated, the management unit 300 starts measuring time by a timer function included in itself when the management unit 300 holds the information before occurrence of an earthquake. This is for the purpose of measuring a time from the transmission of the earthquake early warning.

(2) Processing for Storing Safety Confirmation Results

After that, the management unit 300 of the control device 30 and the transmission unit 62 perform, for each terminal included in the system, steps S2 to S11 described above and transmit safety information indicating whether the user of the terminal is safe, as in the system according to the first example embodiment.

Next, as illustrated in FIG. 14, after S9 or S11, the management unit 300 of the control device 30 stores the results of the processing which is carried out so far, as the result recording table (S32).

Specifically, the management unit 300 stores the names of users of terminals, the phone numbers of the terminals, the base station numbers, and the processing results, which are acquired in S9 or S10, in association with each other as the result recording table. The processing results described above are "safety information indicating that the user is safe", or "safety information indicating that it is unknown whether the user is alive", which is transmitted in S9 or S11. The result recording table is, for example, a table illustrated in FIG. 12.

(3) Processing for Grasping the Number-of-People-not-Confirmed-as-Alive

After that, as illustrated in FIG. 15, the management unit 300 of the control device 30 counts the number-of-people-not-confirmed-as-alive for each base station number registered in the result recording table, when time (measured time) after the transmission unit 302 has transmitted the earthquake early warning has passed a predetermined time. (S33).

The above-described counting of the number-of-people-not-confirmed-as-alive is realized in such a manner that the management unit 300 of the control device 30 performs the following processings (I) to (VII). FIG. 16 is a table (No. 1) illustrating one example of the number-of-people-not-confirmed-as-alive summary list stored in the control device 30.

(I) First, the management unit 300 of the control device 30 arbitrarily selects one of the base station numbers registered in the stored result recording table (table illustrated in FIG. 12).

(II) The management unit 300 of the control device 30 counts the number of pieces of safety information which indicates that the user is safe and is stored in a manner corresponding to the base station number selected in (I) in the above-described result recording table. Herein, the counted number is the number of users who are safe after the occurrence of an earthquake.

(III) The management unit 300 of the control device 30 extracts the number of users corresponding to the base station number selected in (I) in the held information before occurrence of an earthquake. The number of users extracted herein refers to the number of users before occurrence of an earthquake.

(IV) The management unit 300 of the control device 30 subtracts the number counted in (II) (the number of users who are safe) from the number of users extracted in (III) (the number of users before occurrence of an earthquake). The subtracted value corresponds to the number-of-people-not-confirmed-as-alive after the earthquake.

(V) The management unit 300 of the control device 30 extracts, from the evacuation related information table (e.g., the table illustrated in FIG. 11), the area name corresponding to the base station number selected in (I).

(VI) The management unit 300 of the control device 30 stores the area name extracted in (V) and the subtracted value obtained in (IV) (i.e., the number-of-people-not-confirmed-as-alive), in association with each other as a people-who-are-not-confirmed-as-alive summary list as illustrated in FIG. 16.

(VII) After performing the above-described processings (I) to (VI) on all the base station numbers recorded in the result recording table, the management unit 300 of the control device 30 performs the following processing of S34.

(3) Processing for Notifying the Number-of-People-not-Confirmed-as-Alive

The management unit 300 of the control device 30 transmits the people-who-are-not-confirmed-as-alive summary list (list illustrated in FIG. 16) to the server 7 located in the search and rescue agencies such as the fire department and police (S34).

The search and rescue agencies such as the fire department and police can make a determination, for example, to develop search and rescue activities preferentially in the areas in which the number-of-people-not-confirmed-as-alive is large.

(4) Processing for Calculating a Damage Level

FIG. 17 is a table (No. 2) illustrating one example of the number-of-people-not-confirmed-as-alive summary list stored in the control device 30. As illustrated in FIG. 17, the number-of-people-not-confirmed-as-alive summary list may be a list in which the damage level of each area is added. In this case, the management unit 300 of the control device 30 may calculate the damage level of each area in the vicinity of the base station in the above-described S33.

Specifically, the management unit 300 of the control device 30 calculates, as the damage level of an area, the value obtained by dividing the subtracted value obtained in (IV) (the number-of-people-not-confirmed-as-alive) by the number of users extracted in (III) (the number of users before occurrence of an earthquake) after the above-described (V). The above divided value corresponds to the ratio of people who are not confirmed as alive to the number of users before occurrence of an earthquake, and as the ratio is larger, it is assumed that the heavily damage has occurred in the area in which the people exist. In (VI), the management unit 300 of the control device 30 stores the obtained damage level of each area with the area name extracted in (V) and the subtracted value obtained in (IV) (the number-of-people-not-confirmed-as-alive), in association with each other as the people-who-are-not-confirmed-as-alive summary list.

Next, the management unit 300 of the control device 30 transmits the stored people-who-are-not-confirmed-as-alive summary list to the server 7.

The server 7 displays the received people-who-are-not-confirmed-as-alive summary list. The police and fire department that have looked at the list can make a judgment such as performing infrastructure remediation activities from the area with a high damage level, in cooperation with the Ministry of Land, Infrastructure, Transport and Tourism and the like.

(5) Regarding the Management Unit 300

FIG. 18 is a diagram illustrating a configuration example of the management unit 300 included in the control device 30 according to the third example embodiment of the present invention.

As illustrated in FIG. 18, the management unit 300 may include a grasping unit, a number-of-safe-people calculation unit, a number-of-people-not-confirmed-as-alive calculation unit, a reporting unit, and a damage level calculation unit. The grasping unit is a functional unit that carries out the above-described S31 and (III). The number-of-safe-people calculation unit is a functional unit that carries out the above-described (II). The number-of-people-not-confirmed-as-alive calculation unit is a functional unit that carries out the above-described (IV), and the reporting unit is a functional unit that carries out the above-described S34. The damage level calculation unit is a functional unit that carries out the processing described in "(4) calculating a damage level" above.

The other operations are similar to the operations of the first example embodiment, and thus detailed descriptions thereof are omitted.

[Description of Advantageous Effects]

The control device 30 in the system according to the present example embodiment adds up the number-of-people-not-confirmed-as-alive for each area in the vicinity of the base station, and notifies the server located in the search and rescue agencies such as the fire department and police of the add-up result (the area name and the number-of-people-not-confirmed-as-alive). The search and rescue agencies such as the fire department and police can grasp the areas in which the number-of-people-not-confirmed-as-alive is large, and can narrow down the areas in which search and rescue activities are carried out by, for example, preferentially carrying out search and rescue activities in areas in which the number-of-people-not-confirmed-as-alive is large.

Further, the control device 30 in the system according to the present example embodiment calculates the damage level for each area in the vicinity of the base station, and transmits the calculation result (the area name and the damage level) to the server described above. The police and fire department that have looked at the list can make a judgment such as performing infrastructure remediation activities from the area with a high damage level, in cooperation with the Ministry of Land, Infrastructure, Transport and Tourism and the like. The system according to the present example embodiment can provide services for supporting search and rescue activities and remediation activities.

<<Fourth Example Embodiment>>

FIG. 19 is a diagram illustrating a configuration example of a system according to a fourth example embodiment of the present invention. The configuration and operation of the system according to the fourth example embodiment will be described below.

[Description of Configuration]

(1) Configuration of the System According to the Fourth Example Embodiment

As illustrated in FIG. 19, the system according to the fourth example embodiment includes a device 100, a first terminal 200, and a second terminal 210.

(2) Configuration of the Device 100

The device 100 includes a transmission unit 101, a determination unit 102, and a processing unit 103.

The transmission unit 101 of the device 100 may be connected to the first terminal 200 via a wireless line. Further, the processing unit 103 of the device 100 may be connected to the second terminal 210 via a wired line.

(3) Functions of Each Unit of the Terminal 200

The transmission unit 101 transmits, to the first terminal 200 to be connected, a signal for prompting to send a reply by a voluntary operation, on a predetermined occasion associated with occurrence of a disaster.

The above-mentioned "signal for prompting to send a reply by a voluntary operation" may be a message including text such as "Voluntarily activate a mailer to send back the number 464 by mail". The above-mentioned predetermined occasion associated with occurrence of a disaster may be a time when an earthquake early warning is delivered.

The determination unit 102 determines whether the information sent from the first terminal 200 in response to the above-described transmission is voluntary information sent by a voluntary operation performed by the user of the first terminal 200.

For example, the determination unit 102 may determine whether the mail sent from the first terminal 200 in response to the above-described transmission includes the number 464. This is because when the number 464 is included, it is highly likely that the information sent from the first terminal 200 is sent by the voluntary operation performed by the user of the first terminal 200.

When the determination unit 102 determines that the information sent from the first terminal 200 is the voluntary information, the processing unit 103 performs predetermined processing associated with the safety of the user of the first terminal 200. The processing unit 103 may perform processing for transmitting, to the predetermined second terminal 210, safety information indicating that the user of the first terminal 200 is safe, as the above-mentioned predetermined processing.

Alternatively, the processing unit 103 may perform, as the predetermined processing, processing for transmitting predetermined evacuation related information associated with the first terminal 200 to the first terminal 200. This is because the processing for transmitting the evacuation related information associated with the first terminal 200 is processing that is significant when the user of the first terminal 200 is safe and can evacuate, i.e., processing associated with the safety of the user of the first terminal 200.

[Description of Operation]

Next, an operation of the system according to this example embodiment will be described.

First, when an earthquake early warning is delivered, the transmission unit 101 transmits, to the first terminal 200 to be connected, a signal for prompting to send a reply by a voluntary operation, i.e., a message including text such as "Voluntarily activate a mailer to send back the number 464 by mail".

The following description is made assuming that the first terminal 200 displays the above-described message and the user of the first terminal 200 who has voluntarily activated the mailer has sent back the number 464 by mail.

The determination unit 102 determines whether the information sent from the first terminal 200 in response to the above-described transmission is voluntary information sent by a voluntary operation performed by the user of the first terminal 200.

Specifically, the determination unit 102 determines whether the mail sent from the first terminal 200 in response to the above-described transmission includes the number 464.

Here, when the determination unit 102 determines that the information sent from the first terminal 200 is the voluntary information (that is, the information includes the number 464), it is highly likely that the user of the first terminal 200 is voluntarily operating and thus is safe.

In this case, the processing unit 103 performs predetermined processing associated with the safety of the user of the first terminal 200. For example, the processing unit 103 may perform processing for transmitting, to the predetermined second terminal 210, safety information indicating that the user of the first terminal 200 is safe, as the above-mentioned predetermined processing.

The above-mentioned number 464 may be replaced by any other number or text. Any information may be used as the above-mentioned number 464, as long as the information indicates a voluntary operation performed by the user of the terminal 200. Further, the device 100 may be a core network device of a mobile communication system such as a Mobility Management Entity (MME). Furthermore, the device 100 may also be a server installed in the search and rescue agencies such as the fire department or police.

[Description of Advantageous Effects]

First, according to the present example embodiment, the system can notify, with high reliability, the user of the second terminal 210 that the user of the first terminal 200 is safe.

This is because, in the system according to the present example embodiment, the device 100 transmits, to the first terminal 200, the signal for prompting to send a reply by a voluntary operation, and discriminates whether the information sent from the first terminal 200 as a result of the transmission is sent by a voluntary operation performed by the user. When the information sent from the first terminal 200 is information sent by the voluntary operation, it is highly likely that the user of the first terminal 200 is safe.

The above-described discrimination processing enables the system according to the present example embodiment to discriminate, with high reliability, whether the user of the first terminal 200 is safe, and to notify the user of the second terminal 210 that the user of the first terminal 200 is safe. That is, the system according to the present example embodiment can provide a service for notifying, with high reliability, the user of the second terminal 210 that the user of the first terminal 200 is safe.

Furthermore, the system according to the present example embodiment can also perform processing for transmitting, to the first terminal 200, the evacuation related information associated with the first terminal 200, as the predetermined processing. In this case, the above-described discrimination processing enables the system according to the present example embodiment to notify, with a high accuracy, the user of the first terminal 200 who is safe of the evacuation related information. In other words, when the traffic is increasing due to a disaster, the system according to the present example embodiment can first transmit the evacuation related information to the user who can evacuate. The system according to the present example embodiment can provide a service for notifying, the user who is safe with a high accuracy (the user who can evacuate) of the evacuation related information.

As described above, the system according to the present example embodiment can provide, with high reliability, services associated with the safety of the user of the first terminal 200 (e.g., a service for notifying that the user is safe, or a service for notifying the user who is safe of information).

The whole or part of the example embodiments disclosed above can be described as, but not limited to, the following supplementary notes.

(Supplementary Note 1)

A device comprising:

a transmission means for transmitting, to a first terminal to be connected, on a predetermined occasion associated with occurrence of a disaster, a signal for prompting to send a reply by a voluntary operation;

a determination means for determining whether or not the information transmitted from the first terminal in response to the transmission is voluntary information transmitted by the voluntary operation performed by a user of the first terminal; and a processing means for performing predetermined processing associated with safety of a user of the first terminal when the determination means determines that the information is the voluntary information.

(Supplementary Note 2)

The device according to Supplementary Note 1, wherein the processing means transmits, to a predetermined second terminal, safety information indicating that a user of the first terminal is safe, as the predetermined processing.

(Supplementary Note 3)

The device according to Supplementary Note 1 or 2, wherein the processing means transmits, to the first terminal, predetermined evacuation related information associated with the first terminal, as the predetermined processing.

(Supplementary Note 4)

The device according to any one of Supplementary Notes 1 to 3, wherein the transmission means transmits, as the signal, a signal for prompting to send a reply by inputting predetermined information, and the determination means determines that the information is the voluntary information when the information includes the predetermined information.

(Supplementary Note 5)

The device according to any one of Supplementary Notes 1 to 4, wherein the processing means transmits, to a server to be connected, safety information indicating that it is unknown whether a user of the first terminal is alive, when the determination means determines that the information is not the voluntary information.

(Supplementary Note 6)

The device according to any one of Supplementary Notes 1 to 5, being connected to at least one base station to be connected to a terminal, the device further comprising:

a grasping means for grasping, for each of the base stations to be connected, before the occasion, the number of the terminals to be connected to the base station;

a number-of-safe-people calculation means for calculating, for each of the base stations to be connected, the number of the terminals that have transmitted the safety information indicating being safe;

a number-of-people-not-confirmed-as-alive calculation means for calculating, for each of the base stations to be connected, a value obtained by subtracting the number of the terminals calculated by the number-of-safe-people calculation means from the number of the terminals grasped by the grasping means; and a first reporting means for transmitting, for each of the base stations to be connected, the value calculated by the number-of-people-not-confirmed-as-alive calculation means and a predetermined base station identifier indicating the base station, to the server to be connected, wherein the transmission means transmits, for each of the base stations, the signal to the terminal connected to the base station, on the occasion.

(Supplementary Note 7)

The device according to Supplementary Note 6, further comprising:

a damage level calculation means for calculating, for each of the base stations to be connected, a value obtained by dividing the number of the terminals calculated by the number-of-safe-people calculation means by the number of the terminals grasped by the grasping means; and a second reporting means for transmitting, for each of the base stations to be connected, the value calculated by the damage level calculation means and the base station identifier to the server.

(Supplementary Note 8)

The device according to any one of Supplementary Notes 1 to 7, wherein the device is a core network device of a mobile communication system, or the server.

(Supplementary Note 9)

A notification method comprising:

transmitting, to a first terminal to be connected, on a predetermined occasion associated with occurrence of a disaster, a signal for prompting to send a reply by a voluntary operation;

determining whether or not the information transmitted from the first terminal in response to the transmission is voluntary information transmitted by the voluntary operation performed by a user of the first terminal; and performing predetermined processing associated with safety of a user of the first terminal when it is determined in the determination that the information is the voluntary information.

(Supplementary Note 10)

The notification method according to Supplementary Note 9, wherein the predetermined processing is processing of transmitting safety information indicating that a user of the first terminal is safe, to a predetermined second terminal.

(Supplementary Note 11)

The notification method according to any one of Supplementary Notes 9 to 10, wherein the predetermined processing is processing of transmitting, to the first terminal, predetermined evacuation related information corresponding to the first terminal.

(Supplementary Note 12)

The notification method according to any one of Supplementary Notes 9 to 11, wherein a signal for prompting to send a reply by inputting predetermined information is transmitted, as the signal in the transmission, and the information is determined to be the voluntary information in the determination, when the information includes the predetermined information.

(Supplementary Note 13)

The notification method according to any one of Supplementary Notes 9 to 12, further comprising, transmitting safety information indicating that it is unknown whether a user of the first terminal is alive, to a server to be connected, when determining that the information is not the voluntary information in the determination.

(Supplementary Note 14)

The notification method according to any one of Supplementary Notes 9 to 13, being a method for a device to be connected to at least one base station connected to a terminal, the notification method further comprising:

grasping, for each of the base stations to be connected, before the occasion, the number of the terminals to be connected to the base station;

calculating, for each of the base stations to be connected, the number of the terminals that have transmitted the safety information indicating being safe;

calculating, for each of the base stations to be connected, a value obtained by subtracting the calculated number of the terminals from the grasped number of the terminals;

transmitting, for each of the base stations to be connected, the value calculated by the subtraction and a predetermined base station identifier indicating the base station, to the server to be connected; and, at a time of the transmission of the signal, transmitting, for each of the base stations, the signal to the terminal connected to the base station, on the occasion.

(Supplementary Note 15)

The notification method according to Supplementary Note 14, further comprising:

calculating a divided value by dividing the calculated number of the terminals by the grasped number of the terminals, for each of the base stations to be connected; and transmitting the calculated divided value and the base station identifier to the server, for each of the base stations to be connected.

(Supplementary Note 16)

The notification method according to any one of Supplementary Notes 9 to 15, wherein the predetermined occasion associated with the occurrence of a disaster is an occasion when an earthquake early warning or a tsunami flash report is delivered.

(Supplementary Note 17)

The device according to any one of Supplementary Notes 1 to 8, wherein the predetermined occasion associated with the occurrence of a disaster is an occasion when an earthquake early warning or a tsunami flash report is delivered.

(Supplementary Note 18)

The device according to any one of Supplementary Notes 1 to 8, or 17, wherein the processing means transmits, to the second terminal, safety information indicating that it is unknown whether a user of the first terminal is alive, when the determination means determines that the information is not the voluntary information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-161713 filed on Aug. 19, 2015, the disclosure of which is incorporated herein in its entirety by reference.

REFERENCE SIGNS LIST 1, 2 Terminal
3, 4 Base station
5, 7 Server
6, 20, 30 Control device
60, 200, 300 Management unit
61 Storage unit
62, 202 Transmission unit
100 Device
101 Transmission unit
102 Determination unit
103 Processing unit
200 First terminal
210 Second terminal

What is claimed is:

1. A device comprising;
a transmission processor configured to transmit, to a first terminal which is connected to the device, on a predetermined occasion associated with occurrence of a disaster, a signal for prompting to send a reply by a voluntary operation;
a determination processor configured to determine whether or not information transmitted from the first terminal in response to the transmission is voluntary information transmitted by the voluntary operation performed by a user of the first terminal; and
a processing processor configured to perform predetermined processing associated with safety of a user of the first terminal when the determination processor determines that the information is the voluntary information, wherein
the processing processor is configured to transmit, to a server which is connected to the device, safety information indicating that it is unknown whether a user of the first terminal is alive, when the determination processor determines that the information is not the voluntary information.

2. The device according to claim 1, wherein
the device is a core network device of a mobile communication system, or the server.

3. The device according to claim 1, wherein
the processing processor is configured to transmit, to a predetermined second terminal, safety information indicating that it is unknown whether a user of the first terminal is alive, when the determination processor determines that the information is not the voluntary information.

4. The device according to claim 1, wherein
the processing processor is configured to transmit, to a predetermined second terminal, safety information indicating that a user of the first terminal is safe, as the predetermined processing.

5. The device according to claim 1, wherein
the processing processor is configured to transmit, to the first terminal, predetermined evacuation related information associated with the first terminal, as the predetermined processing.

6. The device according to claim 1, wherein
the transmission processor is configured to transmit, as the signal, a signal for prompting to send a reply by inputting predetermined information, and
the determination processor is configured to determined that the information is the voluntary information when the information includes the predetermined information.

7. The device according to claim 1, wherein
the predetermined occasion associated with the occurrence of a disaster is an occasion when an earthquake early warning or a tsunami flash report is delivered.

8. A device connected to at least one base station to be connected to a first terminal, the device comprising:
a grasping processor configured to grasp, for each of the base stations, before the occasion, the number of the first terminals which are connected to the base station;
a transmission processor configured to transmit, to the first terminal, on a predetermined occasion associated with occurrence of a disaster, a signal for prompting to send a reply by a voluntary operation;
a determination processor configured to determine whether or not information transmitted from the first terminal in response to the transmission is voluntary information transmitted by the voluntary operation performed by a user of the first terminal;
a processing processor configured to transmit, to a predetermined second terminal, safety information indicating that a user of the terminal is safe, as a predetermined processing associated with safety of a user of the first terminal when the determination processor determines that the information is the voluntary information;
a number-of-safe-people calculation processor configured to calculate, for each of the base stations, the number of the first terminals associated with transmission of the safety information indicating being safe;
a number-of-people-not-confirmed-as-alive calculation processor configured to calculate, for each of the base stations, a value obtained by subtracting the number of the first terminals calculated by the number-of-safe-people calculation processor from the number of the terminals grasped by the grasping processor; and
a first reporting processor configured to transmit, for each of the base stations, the value calculated by the number-of-people-not-confirmed-as-alive calculation processor and a predetermined base station identifier indicating the base station, to the server which is connected to the device, wherein
the transmission processor is configured to transmit, for each of the base stations, the signal to the first terminal connected to the base station, on the occasion.

9. The device according to claim 8, further comprising:
a damage level calculation processor configured to calculate, for each of the base stations, a value obtained by dividing the number of the terminals calculated by the number-of-safe-people calculation processor by the number of the terminals grasped by the grasping processor; and
a second reporting processor configured to transmit, for each of the base stations, the value calculated by the damage level calculation processor and the base station identifier to the server.

10. A notification method comprising:
transmitting, to a first terminal which is connected, on a predetermined occasion associated with occurrence of a disaster, a signal for prompting to send a reply by a voluntary operation;
determining whether or not information transmitted from the first terminal in response to the transmission is voluntary information, transmitted by the voluntary operation performed by a user of the first terminal;
performing predetermined processing associated with safety of a user of the first terminal when it is determined in the determination that the information is the voluntary information; and
transmitting safety information indicating that it is unknown whether a user of the first terminal is alive, to a server which is connected, when determining in the determination that the information is not the voluntary information.

11. The notification method according to claim 10,
being a method for a device connected to at least one base station connected to a first terminal,
the notification method further comprising:
grasping, for each of the base stations, before the occasion, the number of the first terminals which are connected to the base station;
calculating, for each of the base stations, the number of the first terminals associated with transmission of the safety information indicating being safe;
calculating, for each of the base stations, a value obtained by subtracting the calculated number of the first terminals from the grasped number of the first terminals;
transmitting, for each of the base stations, the value calculated by the subtraction and a predetermined base station identifier indicating the base station, to the server; and,
at a time of the transmission of the signal, transmitting, for each of the base stations, the signal to the first terminal connected to the base station, on the occasion.

12. The notification method according to claim 11, further comprising:
calculating a divided value by dividing the calculated number of the first terminals by the grasped number of the first terminals, for each of the base stations; and
transmitting the calculated divided value and the base station identifier to the server, for each of the base stations.

13. The notification method according to claim 10, wherein
the predetermined processing is processing of transmitting safety information indicating that a user of the first terminal is safe, to a predetermined second terminal.

14. The notification method according to claim 10, wherein
the predetermined processing is processing of transmitting, to the first terminal, predetermined evacuation related information corresponding to the first terminal.

15. The notification method according to claim 10, wherein
a signal for prompting to send a reply by inputting predetermined information is transmitted, as the signal in the transmission, and
the information is determined to be the voluntary information in the determination, when the information includes the predetermined information.

16. The notification method according to claim 10, wherein
the predetermined occasion associated with the occurrence of a disaster is an occasion when an earthquake early warning or a tsunami flash report is delivered.

* * * * *